US008200689B2

(12) United States Patent
Kamimaeda et al.

(10) Patent No.: US 8,200,689 B2
(45) Date of Patent: Jun. 12, 2012

(54) APPARATUS, METHOD AND COMPUTER PROGRAM FOR CONTENT RECOMMENDATION AND RECORDING MEDIUM

(75) Inventors: Naoki Kamimaeda, Kanagawa (JP); Hiroyuki Masuda, Tokyo (JP)

(73) Assignee: Sony Corporation, Tokyo (JP)

( * ) Notice: Subject to any disclaimer, the term of this patent is extended or adjusted under 35 U.S.C. 154(b) by 325 days.

(21) Appl. No.: 12/554,739

(22) Filed: Sep. 4, 2009

(65) Prior Publication Data
US 2010/0036839 A1    Feb. 11, 2010

(30) Foreign Application Priority Data

Sep. 8, 2008 (JP) ............................... P2008-229312

(51) Int. Cl.
*G06F 7/00* (2006.01)
(52) U.S. Cl. ................. 707/767; 707/E17.017
(58) Field of Classification Search .................. 715/530, 715/526, 500, 765, 200, 255, 273
See application file for complete search history.

(56) References Cited

U.S. PATENT DOCUMENTS

| | | | | |
|---|---|---|---|---|
| 6,370,513 | B1 * | 4/2002 | Kolawa et al. | 705/7.33 |
| 6,567,797 | B1 * | 5/2003 | Schuetze et al. | 1/1 |
| 7,373,318 | B2 * | 5/2008 | Kutsumi et al. | 705/26.7 |
| 2001/0044759 | A1 * | 11/2001 | Kutsumi et al. | 705/27 |
| 2004/0172267 | A1 * | 9/2004 | Patel et al. | 705/1 |
| 2006/0020614 | A1 * | 1/2006 | Kolawa et al. | 707/100 |
| 2008/0195607 | A1 * | 8/2008 | Kutsumi et al. | 707/5 |
| 2009/0254541 | A1 * | 10/2009 | Kolawa et al. | 707/5 |

FOREIGN PATENT DOCUMENTS

| | | |
|---|---|---|
| JP | 2004-045565 | 2/2004 |
| JP | 2004-192460 | 7/2004 |
| JP | 2007-202181 | 8/2007 |

* cited by examiner

*Primary Examiner* — Cheyne Ly
(74) *Attorney, Agent, or Firm* — Finnegan, Henderson, Farabow, Garrett & Dunner, L.L.P.

(57) ABSTRACT

A base/inversion component extractor calculates an occupancy rate of each component of a vector of user preference information obtained from information stored on a user preference database, and extracts a base component from the user preference information in accordance with the calculated occupancy rate of the base component. The base/inversion component extractor extracts a similar base component from item preference information obtained from information stored on an item metadatabase. A recommendation engine calculates a similarity between a base vector of the user preference information and a base vector of the item preference information, and identifies, as candidate items, items of the predetermined number in the order of from high to low similarity. The recommendation engine further calculates a similarity between an inversion vector of the user preference information and an inversion vector of the item preference information, and identifies an item candidate having a low similarity.

7 Claims, 16 Drawing Sheets

FIG. 2

| ItemId | MemberId | LogType | LogTime |
|---|---|---|---|
| 1001 | 1 | reserve | 2007-12-05 08:39:44 |
| 1003 | 3 | detail | 2007-12-05 08:39:51 |
| 1009 | 1 | good | 2007-12-05 08:39:52 |
| 1010 | 3 | reserve | 2007-12-05 08:39:53 |
| 1011 | 2 | detail | 2007-12-05 08:39:54 |
| 1001 | 2 | detail | 2007-12-06 08:39:45 |
| 1003 | 1 | good | 2007-12-06 08:39:46 |
| 1004 | 2 | reserve | 2007-12-07 08:39:47 |
| 1005 | 2 | detail | 2007-12-07 08:39:48 |
| 1001 | 3 | bad | 2007-12-08 08:39:49 |
| 1001 | 4 | reserve | 2007-12-08 08:39:50 |
| 1001 | 3 | bad | 2007-12-10 08:39:49 |
| .. | .. | .. | .. |

FIG. 3

| ATTRIBUTE | GENRE | | | PERSON | | | | KEYWORD | | | |
|---|---|---|---|---|---|---|---|---|---|---|---|
| VALUE | DRAMA | NEWS | DOCUMENTARY | ... | ABC | DEF | GHI | ... | GOURMET | TRAVEL | MUSIC | ... |
| SCORE | 5 | 0 | 1 | ... | 0 | 1 | 1 | ... | 3 | 5 | 1 | ... |

FIG. 4

| ItemId | AttributeId | ValueId | No/Times | Score |
|---|---|---|---|---|
| 2000114789142 | 1 | 153144 | 1 | 1.58454294474... |
| 200019580489 | 1 | 153144 | 1 | 1.58454294474... |
| 1000024316163 | 1 | 153144 | 1 | 1.58454294474... |
| 200029239012 | 1 | 153144 | 1 | 1.58454294474... |
| 20003054291 | 1 | 153144 | 1 | 1.58454294474... |
| 1000015188163 | 1 | 153144 | 1 | 1.58454294474... |
| 2000156603690 | 1 | 153144 | 1 | 1.58454294474... |
| 200028798516 | 1 | 153144 | 1 | 1.58454294474... |
| 200023896754 | 1 | 153144 | 1 | 1.58454294474... |
| 1000000208159 | 1 | 153144 | 1 | 1.58454294474... |
| 1000009352163 | 1 | 153144 | 1 | 1.58454294474... |
| 2000118479140 | 1 | 153144 | 1 | 1.58454294474... |
| 200028083320 | 1 | 153144 | 1 | 1.58454294474... |
| 200021717172 | 1 | 153144 | 1 | 1.58454294474... |
| 1000030179163 | 1 | 153144 | 1 | 1.58454294474... |
| 200028082520 | 1 | 153144 | 1 | 1.58454294474... |
| 2000003816163 | 1 | 153144 | 1 | 1.58454294474... |
| 2000010131161 | 1 | 153144 | 1 | 1.58454294474... |
| 20001672573 | 1 | 153144 | 1 | 1.58454294474... |
| 1000000203164 | 1 | 153144 | 1 | 1.58454294474... |
| 2000115762141 | 1 | 153144 | 1 | 1.58454294474... |
| 20003054501 | 1 | 153144 | 1 | 1.58454294474... |
| 1000030781163 | 1 | 153144 | 1 | 1.58454294474... |
| 20003087081 | 1 | 153144 | 1 | 1.58454294474... |
| 200029716614 | 1 | 153144 | 1 | 1.58454294474... |
| 2000138387641 | 1 | 153144 | 1 | 1.58454294474... |
| ⋮ | ⋮ | ⋮ | ⋮ | ⋮ |

FIG. 5

| MemberId | AttributeId | ValueId | Score |
|---|---|---|---|
| 1 | 1 | 30 | 0.5 |
| 1 | 2 | 2 | 0.3 |
| 1 | 2 | 4 | 1.3 |
| 1 | 2 | 52 | 4.4 |
| 1 | 2 | 256 | 12.4 |
| 1 | 2 | 34 | 3.4 |
| 1 | 6 | 2 | 0.9 |
| 1 | 6 | 45 | 0.7 |
| 1 | 6 | 6 | 4.1 |
| 1 | 6 | 3 | 2.3 |
| 1 | 11 | 4 | 0.8 |
| 2 | 1 | 63 | 1.2 |
| 2 | 2 | 4 | 0.3 |
| 2 | 2 | 45 | 0.6 |
| 2 | 2 | 65 | 8.7 |
| 2 | 5 | 76 | 3.2 |
| 2 | 6 | 3 | 0.8 |
| 2 | 11 | 53 | 0.9 |
| ⋮ | ⋮ | ⋮ | ⋮ |

FIG. 9

| MemberId | AttributeId | Weight | DefaultWeight |
|---|---|---|---|
| 1 | 1 | 0.137712831 | 0.137712831 |
| 1 | 2 | 0.012515361 | 0.012515361 |
| 1 | 3 | 0.001645265 | 0.001645265 |
| 1 | 4 | −0.000587898 | −0.000587898 |
| 1 | 5 | −0.010549217 | −0.010549217 |
| 1 | 6 | 0.008269818 | 0.008269818 |
| 1 | 7 | 0.011392073 | 0.011392073 |
| 1 | 8 | 0.009975084 | 0.009975084 |
| 1 | 11 | 0.018032017 | 0.018032017 |
| 1 | 15 | 0.506947155 | 0.506947155 |
| 1 | 103 | −0.001432151 | −0.001432151 |
| 2 | 1 | 0.137712831 | 0.137712831 |
| 2 | 2 | 0.012515361 | 0.012515361 |
| 2 | 3 | 0.001645265 | 0.001645265 |
| 2 | 4 | −0.000587898 | −0.000587898 |
| 2 | 5 | −0.010549217 | −0.010549217 |
| ⋮ | ⋮ | ⋮ | ⋮ |

FIG. 10

| MemberId | TargetScore | AttributeScore | UpdateTime |
|---|---|---|---|
| 1 | 100.0 | &1 = [6265.430664] &6 = [9425.234375] &7 = [255.272858] &8 = [761.2... | 2008-08-03 03:44:58 |
| 1 | 100.0 | &1 = [336.787109] &6 = [334.451447] &7 = [720.280334] &8 = [402.379... | 2008-08-03 05:04:49 |
| 1 | 100.0 | &1 = [336.787109] &6 = [334.451447] &7 = [720.280334] &8 = [402.379... | 2008-08-03 05:06:21 |
| 1 | 100.0 | &1 = [451.940704] &6 = [6511.814453] &7 = [2.631542] &8 = [117.6659... | 2008-08-03 05:34:21 |
| 1 | 100.0 | &1 = [212.0104538] &6 = [92.646942] &7 = [141.809601] &8 = [314.2680... | 2008-08-03 05:41:41 |
| 1 | 100.0 | &1 = [1196.768799] &6 = [14.219811] &7 = [552.059265] &8 = [1761.74... | 2008-08-03 05:41:42 |
| 1 | 100.0 | &1 = [5108.706543] &6 = [2096.364258] &7 = [2.631542] &8 = [4446.82... | 2008-08-03 05:41:44 |
| 1 | 100.0 | &1 = [4595.052734] &6 = [1232.075806] &7 = [255.272858] &8 = [131.2... | 2008-08-03 05:41:45 |
| 1 | 100.0 | &1 = [392.069458] &6 = [123.701576] &7 = [141.809601] &8 = [256.900... | 2008-08-03 05:41:45 |
| 1 | 100.0 | &1 = [1196.768799] &6 = [162.063278] &7 = [552.059265] &8 = [1258.3... | 2008-08-03 05:41:46 |
| 1 | 100.0 | &1 = [1521.472534] &6 = [169.141510] &7 = [454.985870] &8 = [2887.9... | 2008-08-03 05:41:47 |
| 1 | 100.0 | &1 = [506.328156] &2 = [0.795112] &6 = [71.222481] &7 = [135.169006... | 2008-08-03 05:41:48 |
| 1 | 100.0 | &1 = [103.966049] &6 = [19.046486] &7 = [141.809601] &8 = [0.0834174... | 2008-08-03 05:41:49 |
| 1 | 100.0 | &1 = [2105.838867] &6 = [74.356453] &7 = [1.754361] &8 = [127.18352... | 2008-08-03 05:41:52 |
| 1 | 100.0 | &1 = [1006.403198] &6 = [371.461456] &7 = [552.059265] &8 = [22.293... | 2008-08-03 05:41:52 |
| 1 | 100.0 | &6 = [14.583456] &7 = [469.218445] | 2008-08-06 04:36:17 |
| 1 | 100.0 | &6 = [14.583456] &7 = [469.218445] | 2008-08-06 05:37:41 |
| 1 | -100.0 | &6 = [14.583456] &7 = [469.218445] | 2008-08-06 05:57:59 |
| 1 | 100.0 | &1 = [0.257291] &6 = [0.295159] &7 = [0.266610] &8 = [0.032630] &11... | 2008-08-06 21:33:39 |
| 1 | 100.0 | &1 = [0.001919] &7 = [0.266610] | 2008-08-07 02:35:15 |
| 1 | 100.0 | &1 = [56.723831] &6 = [1.977302] &7 = [231.739868] &8 = [0.834174] &... | 2008-08-07 05:48:45 |
| 1 | 100.0 | &1 = [0.097889] &6 = [0.026540] &7 = [0.266610] &8 = [0.003839] &11... | 2008-08-07 05:50:06 |
| 1 | 100.0 | &1 = [0.257291] &6 = [0.295159] &7 = [0.266610] &8 = [0.032630] &11... | 2008-08-07 06:20:02 |
| 1 | 100.0 | &1 = [0.257291] &6 = [0.295159] &7 = [0.266610] &8 = [0.032630] &11... | 2008-08-07 06:29:21 |
| 1 | 100.0 | &6 = [7475.951172] &7 = [253.626312] &8 = [115.238846] &11 = [0.923... | 2008-08-07 21:14:42 |
| .. | .. | .. | .. |

FIG. 14

| UserId | TargetScore | AttributeScore | PERMISSIBLE NUMBER OF USES |
|---|---|---|---|
| 1 | 100.0 | &1={-4.421191}&2={-136.20272... | 1 |
| 1 | 100.0 | &1={-4.421191}&2={-136.20272... | 2 |
| 1 | 100.0 | &1={-4.421191}&2={-136.20272... | 3 |
| 1 | -100.0 | &1={-4.421191}&2={-136.20272... | 1 |
| 1 | -100.0 | &1={-4.421191}&2={-136.20272... | 1 |
| 1 | 100.0 | &6={-2.277009}&103={-47.9749... | 1 |
| 1 | 100.0 | &6={-2.874540}&103={-119.936... | 2 |
| 1 | 100.0 | &6={-0.626769}&103={-47.9749... | 3 |
| 1 | 100.0 | &103={-23.987112} | 2 |
| 1 | 100.0 | &6={-3.236334}&103={-23.9871... | 2 |
| 1 | 100.0 | &6={-2.277009}&103={-47.9749... | 2 |
| 1 | 100.0 | &6={-2.277009}&103={-47.9749... | 1 |
| 1 | 100.0 | &6={-2.874540}&103={-119.936... | 1 |
| .. | .. | .. | .. |

APPARATUS, METHOD AND COMPUTER PROGRAM FOR CONTENT RECOMMENDATION AND RECORDING MEDIUM

BACKGROUND OF THE INVENTION

1. Field of the Invention

The present invention relates to an apparatus, method, computer program and recording medium for recommending content and, in particular, to an apparatus, method, computer program and recording medium for recommending, to a user, content that not only satisfies a preference of the user but also provides a surprise to the user.

2. Description of the Related Art

Techniques of recommending users content such as a recorded broadcast program have been developed. Content recommendation is performed based on a similarity calculated through a matching process between a vector containing as a component an attribute contained in metadata of content and user preference information formed as a vector containing the same number of components as the metadata vector.

However, the recommendation of content having a high similarity with the user preference information does not always satisfy the user. For example, recommending content in drama genre to a user who frequently watches dramas appears reasonable. On the other hand, the same user could be satisfied with recommended news and variety show. If the same type of content is always recommended, the user may get bored and then feel refreshed if content slightly surprising to the user is recommended.

Japanese Unexamined Patent Application Publication No. 2007-202181 discloses a technique of recommending content having a surprise in a manner that reflects more in detail the preference of the user.

For example, recommendation is performed based on a similarity calculated through a matching process with a particular attribute of the user preference information weighted. With this arrangement, it is likely that content having a non-weighted attribute with low a similarity is recommended. Content that may be slightly surprising to the user can be recommended.

SUMMARY OF THE INVENTION

The user can probably enjoy a surprise from content if the content is slightly different in one way or other from items which the user usually views while the user still basically feels familiar with the content on the other hand. For example, if content not matching the user preference is recommended, the user is naturally not satisfied with the content.

In accordance with one technique of the related art, contribution of an attribute to matching results is increased by varying the weight of the attribute. Such a technique does not necessarily recommend to the user content which the user feels familiar with.

The technique of varying the weight of each attribute has the following problem. The weight of a particular attribute of the user preference information may be set to be high. With such a setting, if the value of the attribute contained in the metadata of the content is small, the possibility that that content is recommended remains low. On the other hand, the weight of a particular attribute of the user preference information may be set to be low. If the value of the attribute contained in the metadata of the content is large, the possibility that that content is recommended remains high.

In accordance with the related art, content in genre different from that of the content the user usually views can be recommended, and the user feels a surprise in the content. However, it is still doubtful that such a surprise is affirmatively accepted by the user.

It is thus desirable to recommend content with the preference of the user and surprise to the user taken into consideration.

According to one embodiment of the present invention, a recommendation apparatus includes user base component extraction means for extracting a user base component selected according to a predetermined criterion from among components of user preference information forming a vector containing a plurality of components, the user preference information representing a preference of a user, item base component extraction means for extracting as an item base component a component corresponding to the user base component, from among components of item preference information formed as a vector, the vector containing components of the same number as the number of components of the user preference information, the component of the item preference information generated based on metadata information of each item serving as a target for recommendation, base similarity calculation means for calculating a base similarity, the base similarity being between a user base vector containing the user base components and an item base vector containing the item base components of the items serving as the targets for recommendation, item candidate identifying means for identifying, based on the base similarity, an item candidate to be recommended to the user, user inversion component extraction means for extracting, as a user inversion component, a component other than the user base component from among the components of the user preference information, item inversion component extraction means for extracting, as an item inversion component, a component corresponding to the user inversion component from among the components of the item preference information for the item candidates, inversion similarity calculation means for calculating an inversion similarity, the inversion similarity being between a user inversion vector containing the user inversion components and an item inversion vector containing the item inversion components of the items serving as the target for recommendation, and recommendation item identifying means for identifying an item to be recommended to the user from among the item candidates based on the inversion similarity.

The user base component may be selected in accordance with an occupancy rate of the value of the user base component of the user preference information to the sum of the values of the components of the user preference information.

The user base component may be selected in accordance with the occupancy rate and maturity of the user preference information.

The maturity of the user preference information may be calculated based on information relating to a component of the user preference information, the user preference information being updated by a predetermined operation, the predetermined operation identified as an operation related to the item and performed by the user.

According to one embodiment of the present invention, a recommendation method includes the steps of extracting a user base component selected according to a predetermined criterion from among components of user preference information forming a vector containing a plurality of components, the user preference information representing a preference of a user, extracting as an item base component a component corresponding to the user base component, from among components of item preference information formed as a vector, the vector containing components of the same number as the number of components of the user preference information, the component of the item preference information generated based on metadata information of each item serving as a target for recommendation, calculating a base similarity, the base similarity being between a user base vector containing the user base components and an item base vector containing the item base components of the items serving as the target for recommendation, identifying, based on the base similarity, an item candidate to be recommended to the user, extracting, as a user inversion component, a component other than the user base component from among the components of the user preference information, extracting, as an item inversion component, a component corresponding to the user inversion component from among the components of the item preference information for the item candidates, calculating an inversion similarity, the inversion similarity being between a user inversion vector containing the user inversion components and an item inversion vector containing the item inversion components of the items serving as the targets for recommendation, and identifying an item to be recommended to the user from among the item candidates based on the inversion similarity.

According to one embodiment of the present invention, a computer program causes a computer to perform the steps of extracting a user base component selected according to a predetermined criterion from among components of user preference information forming a vector containing a plurality of components, the user preference information representing a preference of a user, extracting as an item base component a component corresponding to the user base component, from among components of item preference information formed as a vector, the vector containing components of the same number as the number of components of the user preference information, the component of the item preference information generated based on metadata information of each item serving as a target for recommendation, calculating a base similarity, the base similarity being between a user base vector containing the user base components and an item base vector containing the item base components of the items serving as the targets for recommendation, identifying, based on the base similarity, an item candidate to be recommended to the user, extracting, as a user inversion component, a component other than the user base component from among the components of the user preference information, extracting, as an item inversion component, a component corresponding to the user inversion component from among the components of the item preference information for the item candidates, calculating an inversion similarity, the inversion similarity being between a user inversion vector containing the user inversion components and an item inversion vector containing the item inversion components of the items serving as the targets for recommendation, and identifying an item to be recommended to the user from among the item candidates based on the inversion similarity.

According to embodiments of the present invention, the user base component selected according to the predetermined criterion is extracted from among the components of the user preference information forming the vector containing a plurality of components, the user preference information representing the preference of the user. The component corresponding to the user base component is extracted as the item base component from among components of the item preference information formed as a vector. The vector contains components of the same number as the number of components of the user preference information, and the component of the item preference information is generated based on metadata information of each item serving as the target for recommendation. The base similarity between the user base vector containing the user base components and the item base vector containing the item base components of the items serving as the target for recommendation is calculated.

Based on the base similarity, the item candidate to be recommended to the user is identified. The component other than the user base component is extracted as the user inversion component from among the components of the user preference information. The component corresponding to the user inversion component is extracted as the item inversion component from among the components of the item preference information for the item candidates. The inversion similarity between the user inversion vector containing the user inversion components and the item inversion vector containing the item inversion components of the items serving as the targets for recommendation is calculated. The item to be recommended to the user from among the item candidates is identified based on the inversion similarity.

In accordance with embodiments of the present invention, content that not only matches a preference of the user but also provides a surprise to the user may be recommended.

BRIEF DESCRIPTION OF THE DRAWINGS

FIG. 2 illustrates a structure of an operation log database (DB) illustrated in FIG. 1;

FIG. 3 illustrates an example of item metainformation;

FIG. 4 illustrates an item metadatabase illustrated in FIG. 1;

FIG. 5 illustrates a user preference database illustrated in FIG. 1;

FIG. 9 illustrates an attribute weight database illustrated in FIG. 8;

FIG. 10 illustrates an attribute weight adjustment database illustrated in FIG. 8;

FIG. 14 illustrates another example of the attribute weight adjustment database illustrated in FIG. 8;

DESCRIPTION OF THE PREFERRED EMBODIMENTS

The embodiments of the present invention are described below with reference to the drawings.

Figure 1:
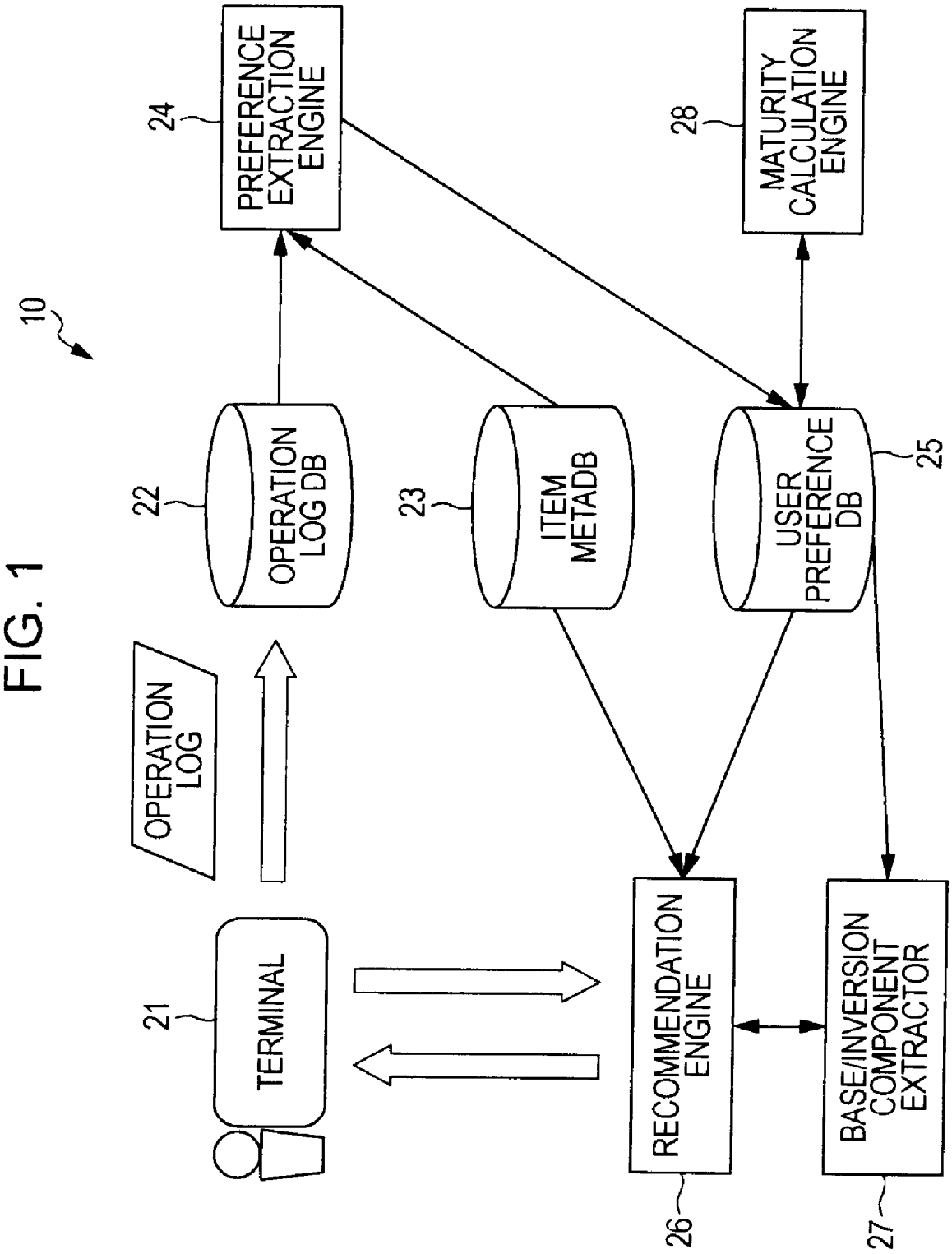
FIG. 1 is a block diagram of a recommendation system in accordance with one embodiment of the present invention.

FIG. 1 is a block diagram illustrating a structure of a recommendation system 10 in accordance with one embodiment of the present invention. The recommendation system 10 is intended to recommend a user an item composed of data such as video and audio. For example, the item contains content such as a broadcast program, content that is obtained by dubbing a movie recorded on a digital versatile disc (DVD), etc.

The recommendation system 10 illustrated in FIG. 1 includes terminal 21, operation log database (DB) 22, item metadatabase (metaDB) 23, preference extraction engine 24, user preference database 25, recommendation engine 26, base/inversion component extractor 27, and maturity calculation engine 28. The operation log database 22 through the maturity calculation engine 28 may be constructed of at least one computer (server) as a recommendation apparatus and is interconnected to the terminal 21 via a network.

The terminal 21 is thus separately arranged from the recommendation apparatus composed of the operation log database 22 through the maturity calculation engine 28. Alternatively, the entire recommendation system 10 may be arranged using at least one computer.

In the recommendation system 10, the recommendation apparatus is designed to transmit to the terminal 21 a list of recommendation items in response to a request from the terminal 21. For example, the recommendation system 10 recommends an item matching the user preference based on metainformation of each item. As will be described later, the recommendation system 10 intentionally recommends the user an item that can be surprising to the user, in response to a request from the terminal 21.

As illustrated in FIG. 1, the user views an item by reproducing data of the content as the item recorded on the terminal 21. Operating the terminal 21, the user may record an item such as a broadcast program. The user may also transmit data of the content stored on the terminal 21 to a mobile terminal. The user may also delete the data of the content from the terminal 21. The user performs a variety of processes on the item in this way by operating the terminal 21.

Information regarding a variety of types of operations of the terminal 21 related to each item is output as an operation log, and a record generated based on the operation log is stored on the operation log database 22. FIG. 2 illustrates data stored on the operation log database 22.

As illustrated in FIG. 2, data listed at each row corresponds to the respective record on the operation log database 22. Each record of the operation log database 22 contains four fields: "ItemId," "MemberId," "LogType," and "LogTime."

The field "ItemId" stores the value of an item ID identifying a target item processed in a corresponding operation. In this case, the values "1001," "1003," "1009," . . . are stored in the fields "ItemId" of the respective records.

The field "MemberId" stores the value of a user (member) ID identifying a user who has executed the operation. The values "1," "3," "1," . . . are stored in the fields "MemberId" of the respective records.

The field "LogType" stores information identifying the type of the operation. In this case, "reserve," "detail," "good," . . . are stored in the fields "LogType" of the respective records. The information stored in the field "LogType" is a character string into which the type of the operation such as viewing the item or recording the item is converted in accordance with a predetermined method.

The field "LogTime" stores information identifying date and time at which the operation was performed. In this example, information "2007-12-05 08:39:44 (representing Dec. 5, 2007, 8 (hours):39 (minutes):44 (seconds)) is stored in the field "LogTime."

Information regarding metainformation attached to each item is stored on the item metadatabase 23. For example, the metainformation is obtained from an electronic program guide (EPG). The metainformation contains information such as genre, performer, keyword, etc. of the item (content).

FIG. 3 illustrates item metainformation attached to a given item (content). The item metainformation contains attribute, value, and score. The attributes of the item metainformation contain "genre," "person (such as a performer in the content)," "keyword," . . . . The values of the item metainformation indicates segments of each attribute. The values contained in the attribute "genre" are "drama," "news," "documentary," . . . . The score of the item metainformation is a score attached to each value. In this example, the score of the value "drama" is "5," the score of the value "news" is "0," the score of the value "documentary" is "1."

The item corresponding to the item metainformation in the example of FIG. 3 is close to drama but also contains an element of documentary.

The values of the attribute "person" lists "ABC," "DEF," "GHI," . . . . In this example, the score of the value "ABC" is "1," the score of the value "DFE" is "1," the score of the value "GHI" is "1," . . . .

The item corresponding to the item metainformation in FIG. 3 contains as the performers thereof "ABC," "DEF," and "GHI" (fictitious names).

The values of the attribute "keyword" in FIG. 3 contain "gourmet," "travel," "music," . . . . The score of the value gourmet" is "3," the score of the value "travel" is "5," the score of the value "music" is "1," . . . . The value of the attribute "keyword" is a predetermined word contained in a message (such as a description of a program in the EPG) introducing an item (such as a broadcast program). For example, the predetermined words such as "gourmet," "travel," and "music" are detected from an introductory sentence of the program in the EPG, and the scores thereof are set in response to the number of detections of each word.

The item corresponding to the item metainformation in FIG. 3 is content related to "gourmet," "travel," and "music" and particularly closely related to "travel."

The item metadatabase 23 stores records into which the item metainformation of each item is divided according to value. FIG. 4 illustrates an example of the data stored on the item metadatabase 23.

Referring to FIG. 4, data listed in each row corresponds to each record on the item metadatabase 23. Each record on the item metadatabase 23 contains four fields: "ItemId," "AttributeId," "ValueId," "No/Times," and "Score."

The field "ItemId" stores the value of an item ID identifying the item of the record. In this example, the values "2000114789142," "200019580489," "100024316163," . . . are stored in the fields "ItemId" of the respective records.

The field "AttributeId" stores the value of an attribute ID identifying the attribute of the record. The value "1" is stored in the field "AttributeId" of each record. The value "1" stored in the field "AttributeId" corresponds to the attribute "genre," the value "2" stored in the field "AttributeId" corresponds to the attribute "person," . . . . In this way, the value in the field "AttributeId" determines the attribute of each record. In the example, all the values in the fields "AttributeId" are "1." In practice, the item metadatabase 23 also contains records having the values "2," "3," . . . in the fields "AttributeId."

The field "ValueId" stores the value of a value ID identifying the value of a record. In this example, the value "153144" is stored in the field "ValueId" of each record. For example, the value "1531441" stored in the field "ValueId" corresponds to the value "drama," the value "153145" stored in the field "ValueId" corresponds to the value "news," . . . . The value of the record is identified by the value in the field "ValueId." In this example, all the values in the fields "ValueId" are "153144." In practice, the item metadatabase 23 also stores records having the values "153145," "153146,"... in the fields "ValueId."

The field "No/Times" stores the value identifying the number of updates of the record. The field "No/Times" may be omitted.

The field "Score" stores the value identifying the score of the value of the record. The values at the scores in FIG. 3 are stored in the fields "Score." For example, a top record in FIG. 4 has a score of the value "drama" (having the value "153144" in the field "ValueId") of the item metainformation of the item having "2000114789142" as the item ID.

The item metadatabase 23 is constructed as described above. The item metadatabase 23 is generated beforehand by acquiring metadata of the content of each item that can be a target of the operation of the terminal 21.

Returning back to FIG. 1, the preference extraction engine 24 causes the user preference database 25 to store data based on the record of the operation log database 22 and the record of the item metadatabase 23.

In response to the record of the operation log database 22, the preference extraction engine 24 identifies the item ID of the item the user has processed by operating the terminal 21, and identifies the type of the operation. In response to the identified item ID, the preference extraction engine 24 searches for the record on the item metadatabase 23, thereby identifying the attribute, value, and score of the item metainformation of the item having the identified item ID.

The preference extraction engine 24 then generates a record that maps the identified attribute, value, and score to the member ID of the user. The preference extraction engine 24 then multiples the value of the score by a coefficient set beforehand in response to the type of the operation. For example, if the type of operation identified in response to the record of the operation log database 22 is recording the item, the value of the score identified based on the record of the item metadatabase 23 is multiplied by a coefficient 3. If the content of operation identified in response to the record of the operation log database 22 is viewing the item, the value of the score identified based on the record of the item metadatabase 23 is multiplied by a coefficient 2.

The record thus generated becomes a record of the user preference database 25. FIG. 5 illustrates an example of the user preference database 25.

Referring to FIG. 5, the data listed at each row corresponds to the record of the user preference database 25. Each record of the user preference database 25 contains four fields: "MemberId," "AttributeId," "ValueId," and "Score."

The field "MemberId" identifies the user in FIG. 5 as previously discussed with reference to the operation log database 22 illustrated in FIG. 2. The field "AttributeId," the field "ValueId," and the field "Score" illustrated in FIG. 5 also identify the attribute, the value, and the score as previously discussed with reference to the item metadatabase 23 of FIG. 4.

The user preference database 25 illustrated in FIG. 5 is generated on a value basis. More specifically, a plurality of records are generated for one operation performed by one person. The records of the number equal to the number of values of the item metainformation of the item as the operation target are generated.

The record is stored on the user preference database 25 each time the operation is performed by the user. More specifically, the records of the number equal to the number of values of the item metainformation of the item as the operation target are generated in response to one operation.

Returning to FIG. 1, the recommendation engine 26 generates the user preference information based on the record of the user preference database 25. The recommendation engine 26 also generates the item preference information based on the record of the item metadatabase 23. The user preference information and the item preference information are respectively vectors, each having the same number of components as the number of attributes. For example, if the sum of attributes of the item preference information is 100, each of the user preference information and the item preference information is a 100-dimensional vector (having 100 components).

The value of each component of the user preference information is determined as below. The recommendation engine 26 checks the records of the user preference database 25 of FIG. 5 and acquires all the records mapped to the member ID of the user. The recommendation engine 26 sorts the records according to the value of the field "AttributeId." If a plurality of records have the same value of the field "AttributeId," the recommendation engine 26 sums as the total number the values of the fields "Score" of these records. The value of components responsive to the attribute "genre" ("1" in the field "AttributeId") in the vector of the user preference information is the sum of the scores of values "drama," "news," "documentary,".... The user preference information is thus generated with the sum of the scores of the attributes being the value of each component.

The value of each component of the item preference information is obtained in the same manner as the value of the user preference information. When the item preference information is generated, the recommendation engine 26 calculates the value of each component of the vector based on the record of the item metadatabase 23 illustrated in FIG. 4. One vector of the item preference information is generated in response to one item ID.

The base/inversion component extractor 27 extracts a base component and an inversion component from the vector of the user preference information and the vector of the item preference information. The base component strongly reflects the user preference and the inversion component strongly reflects surprise to the user. The base/inversion component extractor 27 extracts the base component and the inversion component as described below.

The base/inversion component extractor 27 calculates an occupancy rate of a value that is determined by multiplying each component of the vector of the user preference information by a weight wa expressed in equation (1) to be discussed later. For simplicity of explanation, the user preference information is a three dimensional vector, and the user preference information of a user is a vector (1,2,3). The vector (1,2,3) results from multiplying the original values of the components of the user preference information by the weight wa of equation (1). As will be described later, the weight wa is a coefficient that is determined beforehand for each component of the vector. Weights w1 through w3 are now predetermined. If the original user preference information is a vector (x,y,z), the relationship of $x \cdot w1=1$, $y \cdot w2=2$, and $z \cdot w3=3$ is satisfied.

In this case, the occupancy rate of the first component is calculated in accordance with the following equation:

$$1/(1+2+3)=0.1666 \approx 17\%$$

The occupancy rate of the second component is calculated in accordance with the following equation:

$$2/(1+2+3)=0.3333 \approx 33\%$$

The occupancy rate of the third component is calculated in accordance with the following equation:

$$3/(1+2+3)=0.5000 \approx 50\%$$

The base/inversion component extractor 27 extracts the base component and the inversion component based on the thus calculated occupancy rates. For example, a component having the highest occupancy rate among the components of the vector of the user preference information is the base component, and a component having the second highest occupancy rate is the inversion component. In the discussion that follows, the vector of the user preference information is an N-dimensional vector.

The base/inversion component extractor 27 extracts the component having the third highest occupancy rate, the component having the fourth highest occupancy rate, . . . until the sum of the occupancy rate of the component extracted as the base component, and the occupancy rates of the subsequent extracted components reach a predetermined value (for example, 50%). The base/inversion component extractor 27 then sets these components as the base components.

The value set here (for example, 50%) is determined depending on maturity calculated by the maturity calculation engine 28 to be discussed later.

For example, when the component having the fifth highest occupancy rate is extracted, the sum of occupancy rates of the components extracted as the base components may reach the predetermined value. The base/inversion component extractor 27 then extracts the component having the sixth highest occupancy rate, the component having the seventh highest occupancy rate, . . . , the component having the N-th highest occupancy rate. These components including the one extracted as the first inversion component are set as inversion components. The base components and the inversion components are thus extracted.

The extraction method of the base component and the inversion component described above is one example only. The basic and inversion components may be extracted through another method.

The base/inversion component extractor 27 notifies the recommendation engine 26 of the value of the field "AttributeId" responsive to each of the components extracted as the base components as a base component ID. The base/inversion component extractor 27 also notifies the recommendation engine 26 of the value of the field "AttributeId" responsive to each of the components extracted as the inversion components as an inversion component ID.

The recommendation engine 26 identifies a base component in the vector of the user preference information in response to the base component ID, and a base component in the vector of the item preference information. The recommendation engine 26 also extracts the base component from each of the vector of the user preference information and the vector of the item preference information. A base vector of the user preference information and a base vector of the item preference information are thus generated.

In response to the inversion component ID, the recommendation engine 26 identifies an inversion component in the vector of the user preference information and an inversion component in the vector of the item preference information. The recommendation engine 26 then extracts the inversion component from each of the vector of the user preference information and the vector of the item preference information. An inverse vector of the user preference information and an inverse vector of the item preference information are thus generated.

The recommendation engine 26 performs a matching process to check the basic vector of the user preference information of the user having requested an item recommendation against the basic vector of the item preference information of each item generated from the item metadatabase 23. The matching process may be performed using method of calculating an inner product of vectors, a method of calculating cosine similarity, a method of calculating Euclidean distance, or the like.

If the method of calculating the inner product of the vectors is used as the matching process, similarity sim(X,Y) between vectors X and Y obtained as a result of the matching process is expressed in equation (1):

$$sim(X, Y) = \sum_{a \in A} (|X_a \cdot Y_a| \times w_a) \qquad (1)$$

In equation (1), "A" represents a set of components of the basic vector, and "a" represents one component contained in the set A. "Xa" and "Ya" respectively represent values of the component "a" in the vector X and the vector Y, and "wa" represents a coefficient by which the component a is multiplied, and is also referred to as a weight. The weight wa may be a value predetermined for each component, or may be set for each user.

The weights wa are the coefficients by which the components of the vector are individually multiplied. In practice, the coefficients responsive to the components of the user preference information (item preference information) are present. If the user preference information is a vector having N components, the weights wa are expressed as an N-dimensional vector.

More specifically, if the user preference information (item preference information) has 100 components, the components correspond to a first attribute through a hundredth attribute. In this case, the weight wa is a set of coefficients corresponding to the first through hundredth attributes. Lets $W_n$ represent the weight for the n-th attribute, and the weight wa is represented as a vector containing 100 components as follows:

$$(w_1, w_2, w_3, \ldots, w_{100})$$

In the Matching Process of the Above Described Basic vectors, $w_5$ of $(w_1, w_2, w_3, \ldots, w_{100})$ is substituted for wa in equation (1) if the component a is the fifth component, and similarity is calculated.

The recommendation engine 26 calculates a similarity between the basic vector of the user preference information of the user and the basic vector of the item preference information of each item. The recommendation engine 26 then stores as a basic similarity the calculated similarity with each item (such as the item ID) mapped thereto.

The higher the calculated basic similarity, the more the item matches the user preference.

The recommendation engine 26 extracts items having the high basic similarity by the predetermined number and sets the extracted items as item candidates. The recommendation engine 26 then calculates an inversion similarity for each item candidate as described below.

The recommendation engine 26 calculates a similarity between the inversion vector of the user preference information of the user and the inversion vector of the item preference information of the item candidate in accordance with equation (1). The calculated similarity is then stored as an inversion similarity with each item mapped thereto.

The higher the calculated inversion similarity, the more likely the item matches the user preference.

The recommendation engine 26 calculates a surprise recommendation evaluation value for each item based on the above described basic similarity and inverse similarity. The surprise recommendation evaluation value represents a likelihood at which the user is surprised in a positive way at the recommended item.

For example, the surprise recommendation evaluation value igaiDegree (A) of an item A is calculated in response to an inversion similarity Hanten(A) of the item A in accordance with the following equation:

$$igaiDegree(A)=1-Hanten(A)$$

The smaller the inversion similarity of the item A, the larger the surprise recommendation evaluation value of the item A.

The surprise recommendation evaluation value of the item A can be calculated using the base similarity Base(A) of the item A in accordance with the following equation:

$$igaiDegree(A)=\alpha Base(A)-\beta Hanten(A)$$

In the above equation, $\alpha$ and $\beta$ are respectively predetermined coefficients.

The recommendation engine 26 recommends items of the predetermined number in the order of from high to low surprise recommendation evaluation values. For example, the recommendation engine 26 identifies the items of the predetermined number, starting with the one having the highest surprise recommendation evaluation value, and then generates a recommendation list listing these items. The recommendation engine 26 transmits the recommendation list to the terminal 21.

In accordance with one embodiment of the present invention, the item candidates are narrowed in accordance with the base similarity, and then the surprise recommendation evaluation value is calculated based on the inversion similarity. The items to be recommended are thus identified.

The maturity calculation engine 28 illustrated in FIG. 1 calculates maturity of the user preference information. The maturity is calculated as below. The maturity calculation engine 28 extracts the records of the predetermined number of the user stored on the user preference database 25 in the order from new to old, starting with the newest record. For example, the records generated in response to the three latest operations performed to the terminal 21 by the user are extracted.

The maturity calculation engine 28 checks the field "ValueId" of the extracted record, and stores a value xvn indicating the number of types of the values of the field "ValueId." For example, three latest records of the user are extracted in the order of age. If the values of the fields "ValueId" of the three records are "11," "22," and "33," xvn=3. If the values of the fields "ValueId" of the three records are "11," "22," and "11," xvn=2.

The maturity calculation engine 28 determines a value yvn indicating the sum of the types of the values of the fields "ValueId" present on the user preference database 25, and calculates maturity M in accordance with the following equation:

$$M=1-(xvn/yvn)$$

where the value of xvn is the mean value of the number of types of the values of the fields "ValueId" of the records in response to one operation to the terminal 21 by the user.

More specifically, the maturity calculation engine 28 calculates the maturity M based on the degree of update responsive to the latest operations of the user preference information.

The higher the degree of update responsive to the latest operations of the user preference information, i.e., the larger the value of (xvn/yvn), the larger the change in the user preference is considered to be. If the user preference has changed greatly in the latest operations, it appears that the user preference information of the user remains yet to be matured. Such user preference information is likely to change greatly in the next operations.

If the user preference has not changed greatly in recent operations, the user preference information of the user is considered to be mature. Such user preference information is less likely to change greatly in the next operations.

For example, the value of the maturity M may be set to be zero because of the premature user preference information for a predetermined period of time subsequent to the first generation of the record of the member ID of the user on the user preference database 25. If the number of operations of the user is less than a predetermined threshold value, the value of the maturity M may be set to be zero because the user preference information is considered as premature.

The calculation method of the maturity M has been described for exemplary purposes only, and another method may be used in the calculation of the maturity M.

The sum of the occupancy rates including the occupancy rate of the component extracted as the first base component is set in the base component extraction of the base/inversion component extractor 27 based on the maturity M calculated by the maturity calculation engine 28. As previously described, the value of each original component of the user preference information is multiplied by the respective weight wa in the calculation of the occupancy rate.

For example, if the maturity M falls within a range of from 0% to 40%, the user preference information is considered to be premature, and the sum of the occupancy rates of the base components is set to be 80%. The inversion component extracted from the premature user preference information is considered less reliable.

If the maturity M falls within a range of from 41% to 70%, the user preference information is considered to be modestly mature, and the sum of the occupancy rates of the base components is set to be 65%.

If the maturity M falls within a range of from 71% to 100%, the user preference information is considered to be mature, and the sum of the occupancy rates of the base components is set to be 50%. The inversion component extracted from the mature user preference information is considered to be highly reliable.

The components of the base vector and the inversion vector are finalized based on the maturity M of the user preference information.

In accordance with one embodiment of the present invention, a similarity is calculated based on the base vector and the inversion vector having the components finalized based on the maturity M of the user preference information. First, item candidates are narrowed based on the base similarity. The surprise recommendation evaluation value is then calculated based on the inversion similarity in order to identify an item to be recommended. In this way, it is possible to recommend a user an item possibly positively surprising to the user.

The user can probably enjoy a surprise from content if the content is slightly different in one way or other from items which the user usually views while the user still basically feels familiar with the content on the other hand. For example, if content not matching the user preference is recommended, the user is naturally not satisfied with the content.

In accordance with one technique of the related art, contribution of an attribute to matching results is increased by varying the weight of the attribute. Such a technique does not necessarily recommend, to the user, content which the user feels linked with in an easy to understand fashion.

Even if the weight of a particular attribute of the user preference information is set to be high in the technique of varying the weight of each attribute, the value of the attribute contained in the metadata of the content may be small, and the possibility that that content is recommended remains low. On the other hand, even if the weight of a particular attribute of the user preference information is set to be low, the value of the attribute contained in the metadata of the content may be large and the possibility that that content is recommended remains high.

In accordance with the related art, content in genre different from that of the content the user usually views can be recommended, and the user feels a surprise in the content. However, it is still doubtful that such a surprise is affirmatively accepted by the user.

In accordance with embodiments of the present invention, the item candidates are narrowed based on the base similarity, and the surprise recommendation evaluation value is calculated based on the inversion similarity so that an item to be recommended is identified.

Both the base similarity and the inversion similarity represent the similarity between the user preference information and the item preference information. The higher the value of each of the base similarity and the inversion similarity, the higher the possibility that the item matches the user preference. On the other hand, the lower the value of each of the base similarity and the inversion similarity, the lower the possibility that the item matches the user preference.

For example, if an item having a lower similarity is recommended, the user is definitely surprised at the item. Such an item fails to match the user preference and is not accepted as an affirmative surprise by the user.

In accordance with one embodiment of the present invention, the vectors of the user preference information are divided into to vectors: a base vector and an inversion vector of the user preference information. Items having a high similarity based on the base vector (base similarity) are narrowed, and then an item having a low similarity based on the inversion vector (inversion similarity) is selected. With this arrangement in accordance with the embodiment of the present invention, an item accepted as an affirmative surprise by the user is reliably recommended.

Figure 6:
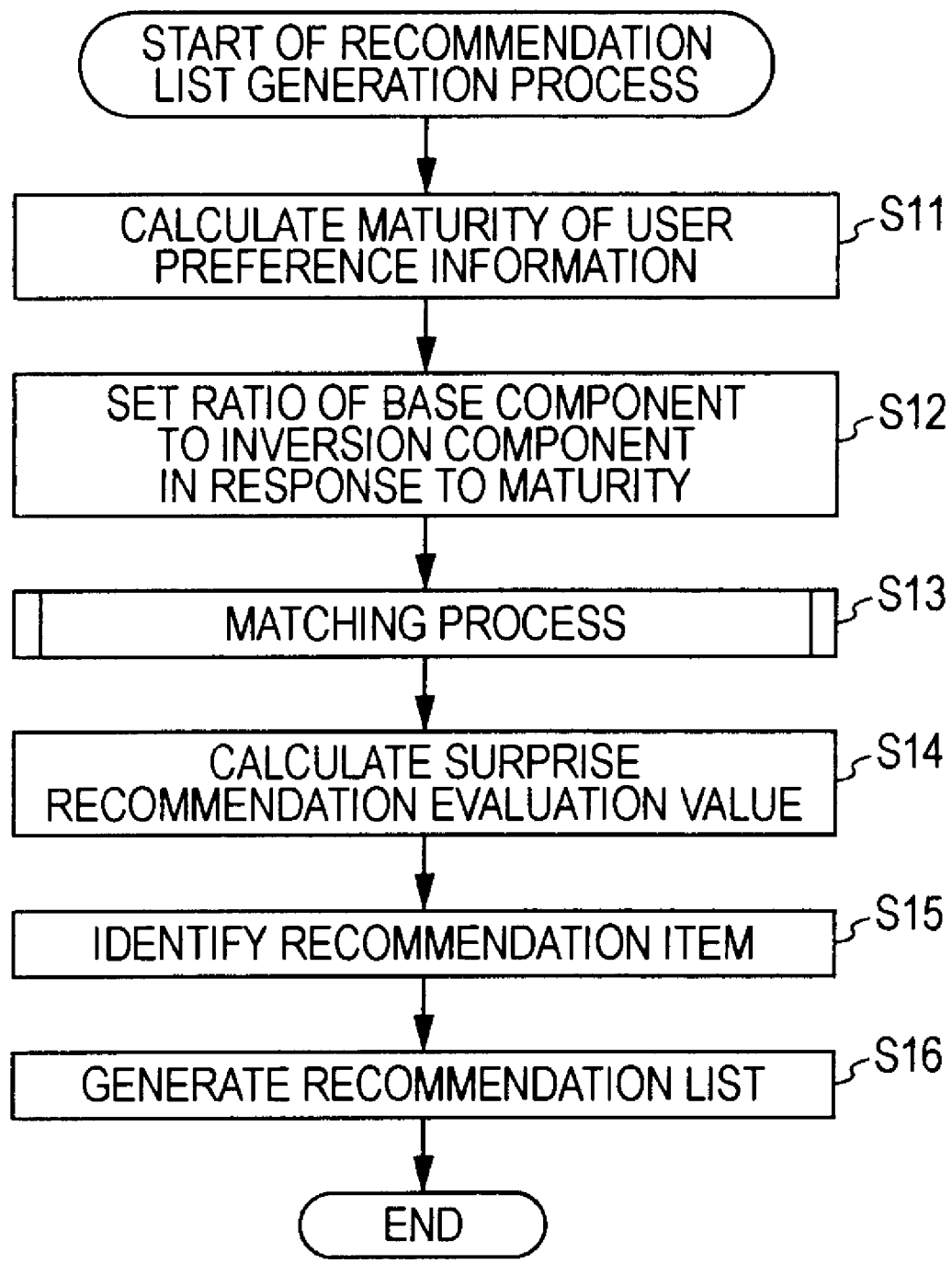
FIG. 6 is a flowchart illustrating a recommendation list generation process of the recommendation system illustrated in FIG. 1.

A recommendation list generation process of the recommendation system 10 illustrated in FIG. 1 is described with reference to a flowchart illustrated in FIG. 6. The recommendation list generation process is executed when a request to recommend the user an item intended to surprise the user is issued.

In step S11, the maturity calculation engine 28 calculates the maturity M.

In step S12, the base/inversion component extractor 27 sets the ratio of the base component to the inversion component based on the maturity M calculated in step S11. For example, the value the maturity M is compared with a predetermined threshold value, and the level of the maturity M of the user preference information is determined (for example, as premature, modestly mature, and mature). The ratio of the base component to the inversion component is set in response to the level of the maturity M. For example, the sum of occupancy rates is set to be 80%, 65%, 50%, or the like.

In step S13, the base/inversion component extractor 27 and the recommendation engine 26 execute a matching process to be discussed later with reference to FIG. 7. The base vector and the inversion vector of the user preference information and the item preference information are subjected to the matching process. The base similarity and the inversion similarity of each item are calculated and stored. The operation in step S13 thus identifies an item candidate serving as a candidate to be recommended.

In step S14, the recommendation engine 26 calculates the surprise recommendation evaluation value for each item candidate identified in step S13. AS previously discussed, the surprise recommendation evaluation value igaiDegree(A) of the item A is calculated based on the inversion similarity Hanten(A) of the item A in accordance with the following equation:

$$igaiDegree(A)=1-Hanten(A)$$

The surprise recommendation evaluation value igaiDegree (A) of the item A can be calculated based on the base similarity Base(A) of the item A in accordance with the following equation:

$$igaiDegree(A)=\alpha Base(A)-\beta Hanten(A)$$

In step S15, the recommendation engine 26 identifies an item to be recommended. In this case, a predetermined number of items having a high surprise recommendation evaluation value are identified from among the item candidates.

In step S16, the recommendation engine 26 generates data of a recommendation list constructed as a list of items identified as an item to be recommended in step S15. The data of the recommendation list generated here is transmitted to the terminal 21. The recommendation list is then displayed on a display of the terminal 21 to recommend the user the item.

The recommendation list generation process is thus executed. In this way, an item providing the user with an affirmative surprise is recommended.

Figure 7:
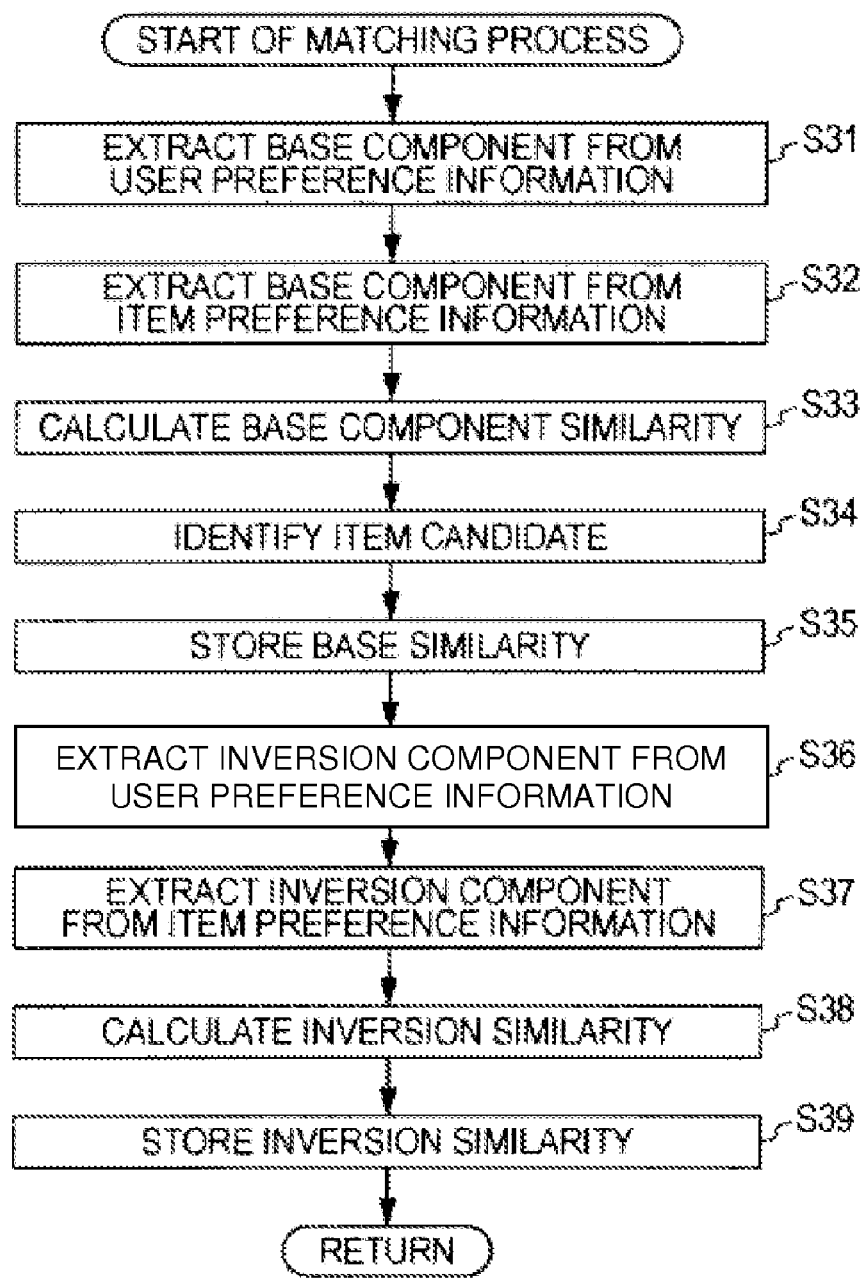
FIG. 7 is a flowchart illustrating a matching process.
Figure 16:
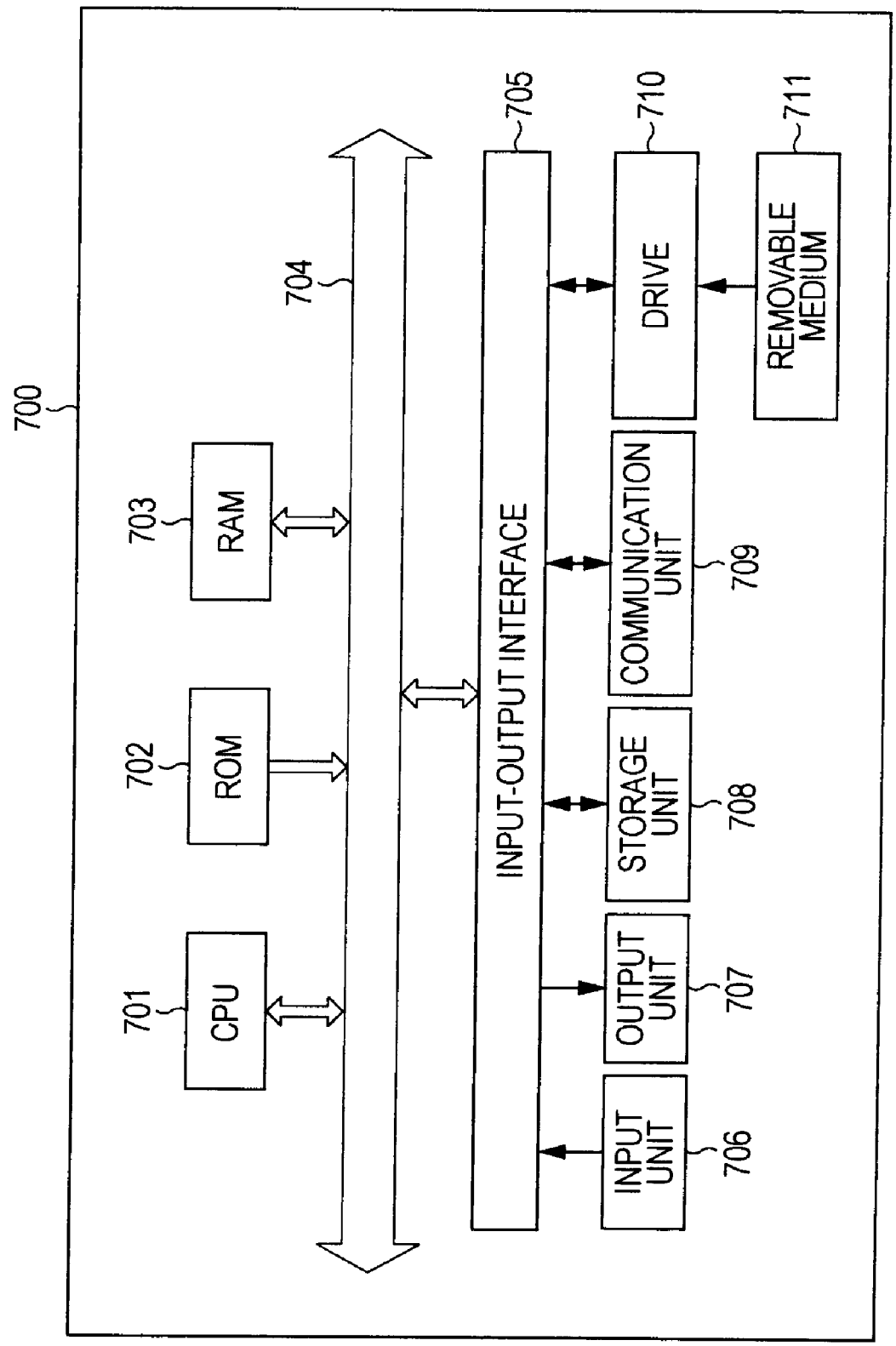
FIG. 16 is a block diagram illustrating a structure of a personal computer.

With reference to a flowchart illustrated in FIG. 7, the matching process in step S13 illustrated in FIG. 16 is described in detail.

In step S31, the base/inversion component extractor 27 extracts the basic component from the user preference information.

As previously discussed, the base/inversion component extractor 27 calculates the occupancy rate of a value resulting from multiplying each component of the vector of the user preference information by each weight of equation (1). For example, a component having the highest occupancy rate from among the components of the vector of the user preference information is set to be a base component, and a component having the second highest occupancy rate is not set to be a base component. Components having the third, fourth, . . . , highest occupancy rates are extracted until the sum of the occupancy rates of the extracted components including the first component reaches the value processed in step S12. These components are set to be the base components. The base components are extracted from the user preference information based on the value the field "AttributeId" of the extracted base components.

In step S32, the base/inversion component extractor 27 extracts the base component from the item preference information. In this case, the component corresponding to the base component extracted in step S31 is extracted from the item preference information.

In step S33, the recommendation engine 26 calculates a similarity between the base vector of the user preference information composed of the base component extracted in step S31 and the base vector of the item preference information composed of the base component extracted in step S32. The similarity is calculated using equation (1), for example. The similarities of the number equal to the number of items to be recommended is calculated. These similarities become base similarities corresponding to the items.

In step S34, the recommendation engine 26 identifies as item candidates items of a predetermined number calculated in step S33 in the order from high to low similarity.

In step S35, the recommendation engine 26 stores the base similarities calculated in step S33 with the item candidates identified in step S34 mapped thereto.

In step S36, the base/inversion component extractor 27 extracts the inversion component from the user preference information. In this case, for example, components not extracted as the base component in step S31 are extracted as inversion components.

In step S37, the base/inversion component extractor 27 extracts the inversion component from the item preference information. In this case, a component corresponding to the inversion component extracted in step S36 is extracted from the item preference information.

In step S38, the recommendation engine 26 calculates a similarity between the inversion vector of the user preference information composed of the inversion component extracted in step S36 and the inversion vector of the item preference information composed of the inversion component extracted in step S37. The similarity is calculated using equation (1), for example. The similarities of the number equal to the number of items to be recommended are calculated. These similarities become inverse similarities corresponding to the items.

In step S39, the recommendation engine 26 stores the inversion similarities calculated in step S38 with the item candidates identified in step S34 mapped thereto.

The matching process is performed in this way.

In the above discussion, the recommendation system 10 recommends the item that is intended to surprise the user. It is also possible to recommend an item that is not intended to surprise the user. If the recommendation system 10 recommends an item not intended to surprise the user, the recommendation engine 26 performs directly a matching process on the user preference information and the item preference information, and calculates the similarity. An item having a high calculated similarity is recommended.

The weight wa of equation (1) may be the one predetermined for each component, or may be the one preset for each user.

When the similarity is calculated between the user preference information and the item preference information, a fixed weight not dependent on individuals is used in the related art. In practice, however, the attribute considered to be important is different from user to user, and the common fixed value may not compensate for individual difference. Even if an item is recommended by calculating the similarity using the weight as a common fixed value, an item truly matching the user preference may not be recommended.

For example, the user may be allowed to input an important attribute and the weight may be adjusted individually in response to the input results. With such an arrangement, the individual difference can be compensated for.

The user preference is a very abstract concept and even the user has difficulty expressing their own preference. The user may not easily find an important attribute.

The user preference may change with time. For example, after viewing a large amount of content including broadcast programs and DVDs, the user may find an attribute more important than the attribute which was first thought to be important.

In accordance with one embodiment of the present invention, the weight optimum to each user can be automatically adjusted.

Figure 8:
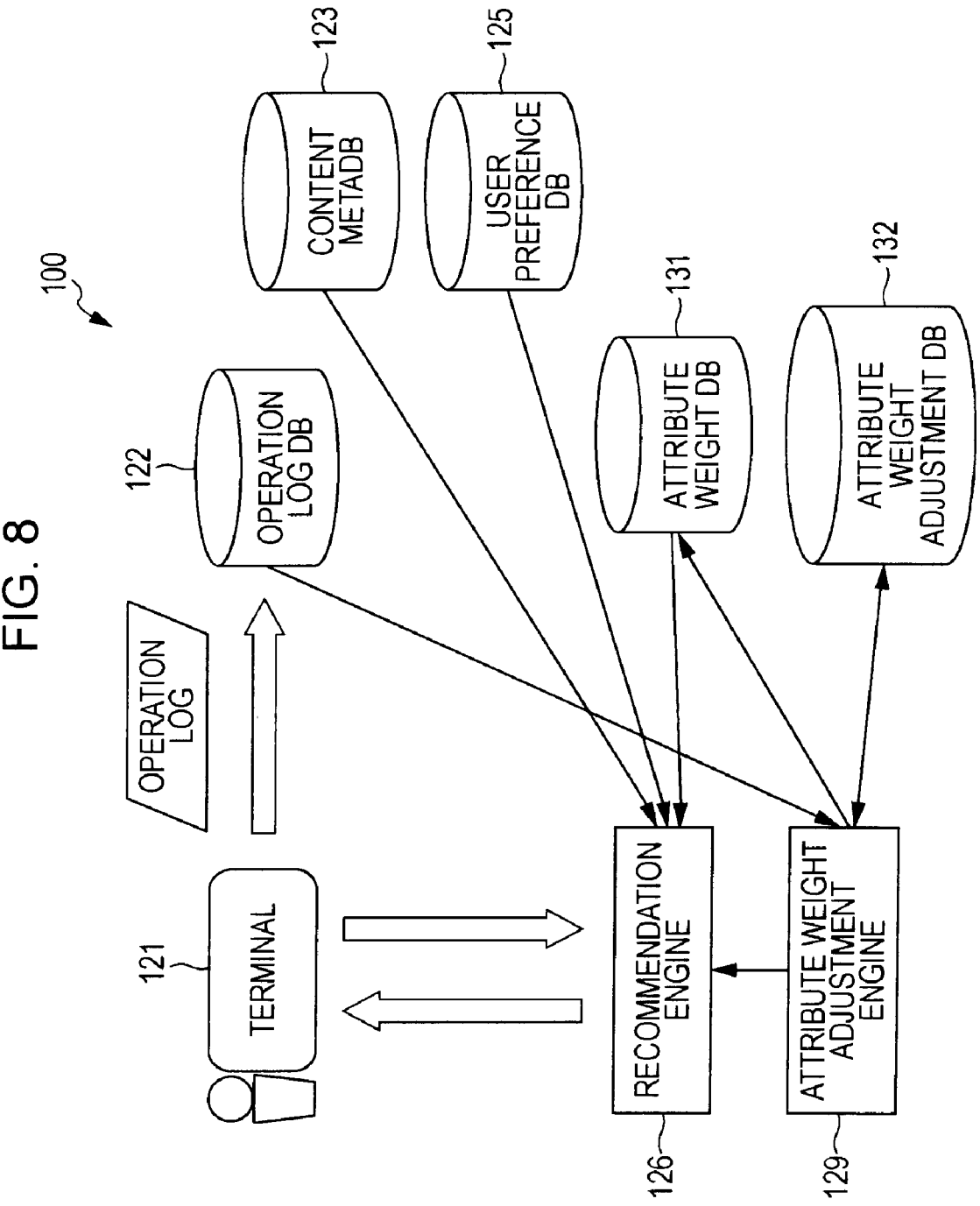
FIG. 8 is a block diagram illustrating another recommendation system in accordance with one embodiment of the present invention.

FIG. 8 is a block diagram illustrating a recommendation system 100 that allows the weight to be automatically adjusted to the one optimum to the user.

The recommendation system 100 illustrated in FIG. 8 includes terminal 121, operation log database 122, content metadatabase 123, user reference database 125, recommendation engine 126, attribute weight adjustment engine 129, attribute weight database 131, and attribute weight adjustment database 132. The operation log database 122 through the attribute weight adjustment database 132 illustrated in FIG. 8 may be constructed as a recommendation apparatus including at least one server, and connected to the terminal 121 via a network.

The terminal 121 is thus separately arranged from the recommendation apparatus composed of the operation log database 122 through the attribute weight adjustment database 132. Alternatively, the entire recommendation system 100 may be arranged using at least one computer.

The terminal 121, the operation log database 122, the content metadatabase 123, and the user reference database 125 illustrated in FIG. 8 are respectively identical to the terminal 21, the operation log database 22, the item metadatabase 23, and the user preference database 25 illustrated in FIG. 1, and the detailed discussion thereof is omitted here. The operation log database 122 is composed of records as previously discussed with reference to FIG. 2. The content metadatabase 123 is also composed of records as previously discussed with reference to FIG. 4. The user reference database 125 is composed of records as previously discussed with reference to FIG. 5. FIG. 8 does not illustrate a functional block corresponding to the preference extraction engine 24 illustrated in FIG. 1. As previously discussed with reference to FIG. 1, the records of the user reference database 125 are generated.

FIG. 9 illustrates the attribute weight database 131. As illustrated in FIG. 9, data on each row corresponds to a record of the attribute weight database 131. In this case, each record of the attribute weight database 131 includes four fields: a field "MemberId," a field "AttributeId," a field "Weight," and a field "DefaultWeight."

The field "MemberId" stores information identifying the user as discussed with reference to the operation log database 22 illustrated in FIG. 2. The field "AttributeId" stores information identifying the attribute as discussed with reference to the item metadatabase 23 illustrated in FIG. 4.

The field "Weight" store the value of the weight of the user identified by the field "MemberId." As described above, the weight is set on a per attribute basis, and the field "Weight" stores the value of the weight of the attribute corresponding to the value of the field "AttributeId."

The field "DefaultWeight" stores a default value of the weight of the user identified by the field "MemberId." The default value of the weight may be a predetermined value or may be a value preset for each user. Before the weight of the user is automatically adjusted, the field "Weight" stores the value at the field "DefaultWeight."

As illustrated in FIG. 9, the record having "1" or "2" as the value at the field "MemberId" is stored on a per attribute basis. As listed, each record stores the value of the field "DefaultWeight" at the field "Weight," and the weight of the user is not automatically adjusted yet.

The attribute weight adjustment engine 129 illustrated in FIG. 8 generates the record of the attribute weight adjustment database 132 based on the record stored on the operation log database 122. The attribute weight adjustment database 132 stores information that is used to calculate the weight adjusted for a predetermined user.

FIG. 10 illustrates an example of the attribute weight adjustment database 132. With reference to FIG. 10, data at each row corresponds to each record of the attribute weight adjustment database 132. Each record of the attribute weight adjustment database 132 includes four fields: a field "MemberId," a field "TargetScore," a field "Attributescore," and a field "UpdateTime."

The field "MemberId" illustrated in FIG. 10 stores information identifying the user as illustrated with reference to the operation log database 22 in FIG. 2.

As illustrated in FIG. 10, the field "TargetScore," and the field "Attributescore" store information obtained as described below.

The attribute weight adjustment engine 129 checks information stored in the field "LogType" of each record on the operation log database 122. As previously discussed, the field "LogType" in the record of the operation log database 122 stores "reserve," "detail," "good," . . . . The information stored in the field "LogType" may be a character string into which an operation type such as viewing an item, or recording an item is converted in accordance with a preset method.

The attribute weight adjustment engine 129 acquires, as record to be used to generate a record of the attribute weight adjustment database 132, a record having information to be stored in the field "LogType" identical to preset information. The record to be used to generate the record of the attribute weight adjustment database 132 is a record that has been generated in response to an operation that allows the evaluation of the user regarding a target item to be estimated.

For example, if the user views or records an item, the item seems to be positively evaluated by the user. On the other hand, if the user deletes the data of the content corresponding to an item, the item seems to be negatively evaluated by the user.

The information stored in the field "LogType" of each record of the operation log database 122 is represented in a character string converted in accordance with the preset method so that the user evaluation regarding the operation type is estimated. For example, the user may view or record an item. Information stored in the field "LogType" of a record generated in response to the operation is "good." For example, the user may delete the data of the content of an item. Information stored in the field "LogType" of a record generated in response to the operation is "bad."

The attribute weight adjustment engine 129 acquires the record having the information stored in the field "LogType" being "good" or "bad" as the information to be used to generate the record of the attribute weight adjustment database 132.

In response to the value of the field "ItemId" of the record thus acquired, the attribute weight adjustment engine 129 identifies an item having served as an operation target, and causes the recommendation engine 126 to generate the item preference information of that item. As previously discussed, the item preference information is a vector containing components of the same number as the number of attributes, and is thus generated based on the record of the content metadatabase 123. In response to the value of the field "MemberId" of the record thus acquired, the attribute weight adjustment engine 129 identifies the user who has executed the operation, and generates the user preference information of the user based on the record of the user reference database 125.

The attribute weight adjustment engine 129 causes the recommendation engine 126 to execute the matching process on the item preference information and the user preference information. For example, the calculation represented by equation (1) is performed. The attribute weight adjustment engine 129 acquires from the recommendation engine 126 the value of $|X_a \cdot Y_a|$ in equation (1) as the similarity of an attribute "a" and generates information that maps the similarity of each attribute to the attribute ID. This information is to be stored in the field "Attributescore."

Described in the field "Attributescore" in the first record in FIG. 10 is "&1={6265.430664}&6= {9245.234375}&7={255.272858} . . . " The field "Attributescore" of the first record means that the similarity of the attribute having an attribute ID of "1" is "6265.430664," that the similarity of the attribute having an attribute ID of "6" is "9245.234375," and that the similarity of the attribute having an attribute ID of "7" is "255.272858."

A target value of the similarity determined based on the information stored in the field "LogType" is stored in the field "TargetScore." The target value of the similarity is a target value between the item preference information and the user preference information, and corresponds to a value of sim(X, Y) in equation (1). For example, "100.01" is stored in the field "LogType" if the information stored in the field "LogType" of the record to be used to generate the record of the attribute weight adjustment database 132 is "good." "−100.0", is stored in the field "LogType" if the information stored in the field "LogType" of the record to be used to generate the record of the attribute weight adjustment database 132 is "bad." The target value of similarity corresponding to "good" ("100.0" here) and the target value of similarity corresponding to "bad" ("−100.0" here) are determined beforehand.

Information identifying date and time of the generation of the record is stored in the field "UpdateTime" illustrated in FIG. 10.

The records of the attribute weight adjustment database 132 are generated in this way. More specifically, the number of records of the attribute weight adjustment database 132 to be generated is determined based on the number of records acquired as records to be used to generate the record of the attribute weight adjustment database 132, output of the records of the operation log database 122.

The attribute weight adjustment engine 129 adjusts the weight of each user based on the record of the attribute weight adjustment database 132. The weight adjustment is performed through the multiple regression analysis that uses a target value of similarity obtained from the field "TargetScore" of the record of the attribute weight adjustment database 132 (hereinafter referred to as a target similarity) and a similarity of each attribute obtained from the field "Attributescore" of the record of the attribute weight adjustment database 132.

The attribute weight adjustment engine 129 executes the multiple regression analysis with the target similarity being a dependent variable and the similarity of each attribute being an explanatory variable. The attribute weight adjustment engine 129 thus predicts an optimum value of the weight of each attribute.

The weight wa is thus determined based on each component (attribute). For example, the following linear equation results from the first record illustrated in FIG. 10:

$$100.0 = 6265.430664 \times w_1 + 9245.234375 \times w_6 + 255.272858 \times w_7 + \ldots$$

The following linear equation results from the second record illustrated in FIG. 10:

$$100.0 = 336.787109 \times w_1 + 334.451447 \times w_6 + 720.280334 \times w_7 + \ldots$$

The above described linear equations are generated based on the record having a member ID of "1" out of the records of the attribute weight adjustment database 132. A determinant is created by summing the right sides and the left sides of these equations. Solution ($w_1$, $w_6$, $w_7$, . . . ) is determined using the least squares method. The multiple regression analysis is thus performed.

The weight is expressed using ($w_1$, $w_6$, $w_7$, . . . ). If the number of records of the attribute weight adjustment database 132 is sufficiently large, weights $w_2$, $w_3$, $w_4$, . . . can also be determined. With a sufficient large number of records obtained, the user reference database 125 executes the multiple regression analysis with the target similarity being a dependent variable and the similarity of each attribute being an explanatory variable. The attribute weight adjustment engine 129 thus determines the weight wa of equation (1). For example, if 100 components of the user preference information are present, $w_1$, $w_2$, $w_3$, . . . , $w_{100}$ are calculated through the multiple regression analysis.

The attribute weight adjustment engine 129 determines an optimum value of the weight of each attribute. Equation (1) is calculated based on the weights thus determined in order to determine the similarity. The item having "good" as the information stored in the field "LogType" results in a similarity close to "100.0" with the item preference information. The item having bad" as the information stored in the field "LogType" results in a similarity close to "−100.0" with the item preference information. More specifically, the similarity of the item highly evaluated by the user becomes high and the similarity of the item not highly evaluated by the user becomes low.

The attribute weight adjustment engine 129 stores each of the weight value adjusted described above in the field "Weight" of the record of the attribute weight database 131. The record of the attribute weight database 131 here is generated as a record responsive to the member ID of the user on a per attribute basis.

In order to identify the item to be recommended to the user, the recommendation engine 126 calculates the similarity between the user preference information of the user and the item preference information of each item using the value stored in the field "Weight" of the record of the attribute weight database 131. In the calculation of the similarity (sim (X,Y)), the value of the weight responsive to the attribute of each user identified based on the record of the attribute weight database 131 is used as wa in equation (1).

The recommendation engine 126 recommends items of the predetermined number, starting with the one having the highest similarity thus calculated. For example, the recommendation engine 126 identifies items of the predetermined number from high to low similarity, and then generates a recommendation list composed a list of items. The recommendation engine 126 then transmits the recommendation list to the terminal 121.

The recommendation system 100 thus recommends the item to the user. Since the important attribute is different from user to user, an item truly matching the user preference may not be recommended if the item is recommended with the similarity calculated based on the weight as a common fixed value.

The user preference is a very abstract concept and even the user has difficulty expressing their own preference. Moreover, the user may not easily find an important attribute, and the user preference may change with time.

In accordance with one embodiment of the present invention, the user's evaluation of the item is estimated based on the operation log database, and the target similarity of the record of the attribute weight adjustment database 132 is set. The multiple regression analysis is executed based on the target similarity and the similarity of each attribute. The attribute weight of each user is determined. The weight optimum to each user is automatically set.

Figure 11:
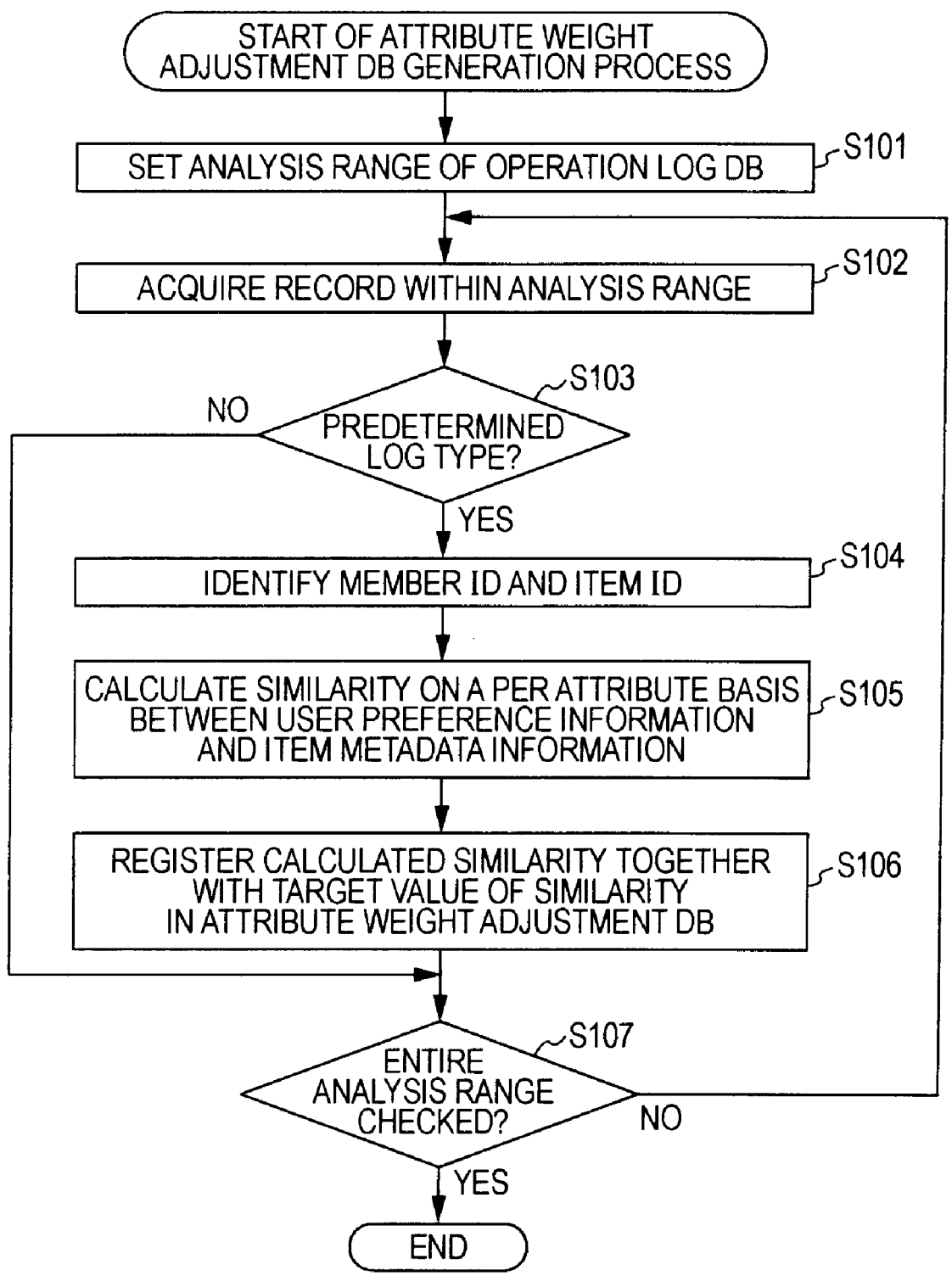
FIG. 11 is a flowchart illustrating an attribute weight adjustment database generation process.

The attribute weight adjustment database generation process of the recommendation system 100 illustrated in FIG. 8 is described below with reference to a flowchart illustrated in FIG. 11. This process is executed when the record of the attribute weight adjustment database 132 is generated.

In step S101, the attribute weight adjustment engine 129 sets an analysis range of the operation log database 122. The analysis range is set as information representing date and time. Records within the analysis range are those falling within a range from the specified date and time to the present time out of the records of the operation log database 122.

In step S102, the attribute weight adjustment engine 129 acquires the records within the analysis range set in step S101. The determination of whether the record is within the analysis range is performed based on the information described in the field "LogTime" of the record of the operation log database 122.

In step S103, the attribute weight adjustment engine 129 determines whether the record acquired in step S102 is a record of a predetermined log type. For example, the attribute weight adjustment engine 129 determines whether the information stored in the field "LogType" of the record is a predetermined type to be used to generate the record of the attribute weight adjustment database 132. For example, the information stored in the field "LogType" is "good" or "bad," processing proceeds to step S104.

In step S104, the attribute weight adjustment engine 129 identifies the member ID and the item ID of the record.

In step S105, the attribute weight adjustment engine 129 causes the recommendation engine 126 to execute the matching process between the user preference information responsive to the member ID identified in step S104 and the item preference information responsive to the identified item ID. In this case, equation (1) is calculated. In step S105, the attribute weight adjustment engine 129 acquires from the recommendation engine 126 the value of $|X_a \cdot Y_a|$ in equation (1) as the similarity of the attribute "a," and generates information that maps the similarity of each attribute to the attribute ID. The similarity is thus calculated on a per attribute basis. As previously discussed, the information that maps the similarity of each attribute to the attribute ID is information stored in the field "Attributescore" of the record of the attribute weight adjustment database 132.

In step S106, the attribute weight adjustment engine 129 maps the information obtained in step S105 to the target value of similarity, thereby generating the record of the attribute weight adjustment database 132 as described above with reference to FIG. 10. The attribute weight adjustment engine 129 then registers the record onto the attribute weight adjustment database 132.

As described above, if the information to be stored in the field "LogType" of the record to be used to generate the record of the attribute weight adjustment database 132 is "good," the target similarity is "100.0." Also, if the information to be stored in the field "LogType" of the record to be used to generate the record of the attribute weight adjustment database 132 is "bad," the target similarity is "−100.0."

If it is determined in step S103 that the record acquired in step S102 is not a record of a predetermined log type, steps S104-S106 are skipped.

In step S107, it is determined whether all the records within the analysis range have been checked. If it is determined in step S107 that not all the records within the analysis range have been checked, processing returns to step S102.

Steps S102-S107 are repeated until it is determined in step S107 that all the records within the analysis range have been checked.

The attribute weight adjustment database generation process is thus executed.

An attribute weight calculation process of the recommendation system 100 illustrated in FIG. 8 is described below with reference to a flowchart illustrated in FIG. 12. This process is periodically performed at predetermined intervals on each user of the terminal 121. More specifically, the attribute weight calculation process is first performed on a user A, and is then performed again at a next timing after a predetermined number of days from the first timing. The attribute weight calculation process is performed on the user A again after the predetermined number of days from the second timing, and so on.

Alternatively, the attribute weight calculation process may be performed each time an execution command is issued from the user.

In step S121, the attribute weight adjustment engine 129 identifies the member ID. In the process to be executed from now on, the weight of the attribute of the user responsive to the member ID identified in step S121 is calculated.

In step S122, the attribute weight adjustment engine 129 checks the record of the member ID identified in step S121 out of the records stored on the attribute weight adjustment database 132.

In step S123, the attribute weight adjustment engine 129 determines whether the number of records checked in step S122 is N or larger. Here, N is a predetermined number, and serves as a threshold value according to which a determination of presence of a sufficient number of records to execute the multiple regression analysis is performed.

If it is determined in step S123 that records of N or more are present, processing proceeds to step S124.

In step S124, the attribute weight adjustment engine 129 adjusts the weight of the user based on the record of the attribute weight adjustment database 132 checked in step S122. The weight adjustment is performed through the multiple regression analysis based on the target similarity from the field "TargetScore" of the record of the attribute weight adjustment database 132 and the similarity of each attribute from the field "Attributescore" of the record of the attribute weight adjustment database 132.

In step S125, the attribute weight adjustment engine 129 identifies the weight resulting from step S124 as the weight of each attribute of the user identified in step S121.

In step S126, the attribute weight adjustment engine 129 updates the attribute weight database 131 to reflect the attribute weight of the user identified in step S125. More specifically, the records of member ID identified in step S121 are acquired from the record of the attribute weight database 131 illustrated in FIG. 9, and the values of the fields "AttributeId" of these records are checked. The attribute weight of the user identified in step S125 overwrites the value the field "Weight" of the record having the value of the field "AttributeId" representing that attribute. The number of attributes equals the number of components of the user preference information. For example, if 100 components of the user preference information are present, the values of the fields "Weight" of the 100 records of the attribute weight database 131 are overwritten.

Subsequent to step S126, the attribute weight adjustment engine 129 performs an attribute weight adjustment database management process in step S127. In the attribute weight adjustment database management process, an unnecessary record is deleted from the attribute weight adjustment database 132. The detail of the attribute weight adjustment database management process will be described later with reference to FIGS. 13-15.

The attribute weight calculation process is executed in this way.

In accordance with one embodiment of the present invention, the user's evaluation of the item is estimated based on the operation log database of each user, and the target similarity of the record of the attribute weight adjustment database 132 is set as previously discussed with reference to FIG. 11. As previously discussed with reference to FIG. 12, the multiple regression analysis is performed using the target similarity and the similarity of each attribute. The attribute weight of the user is thus determined. The weight optimum to each user is automatically set.

Figure 12:
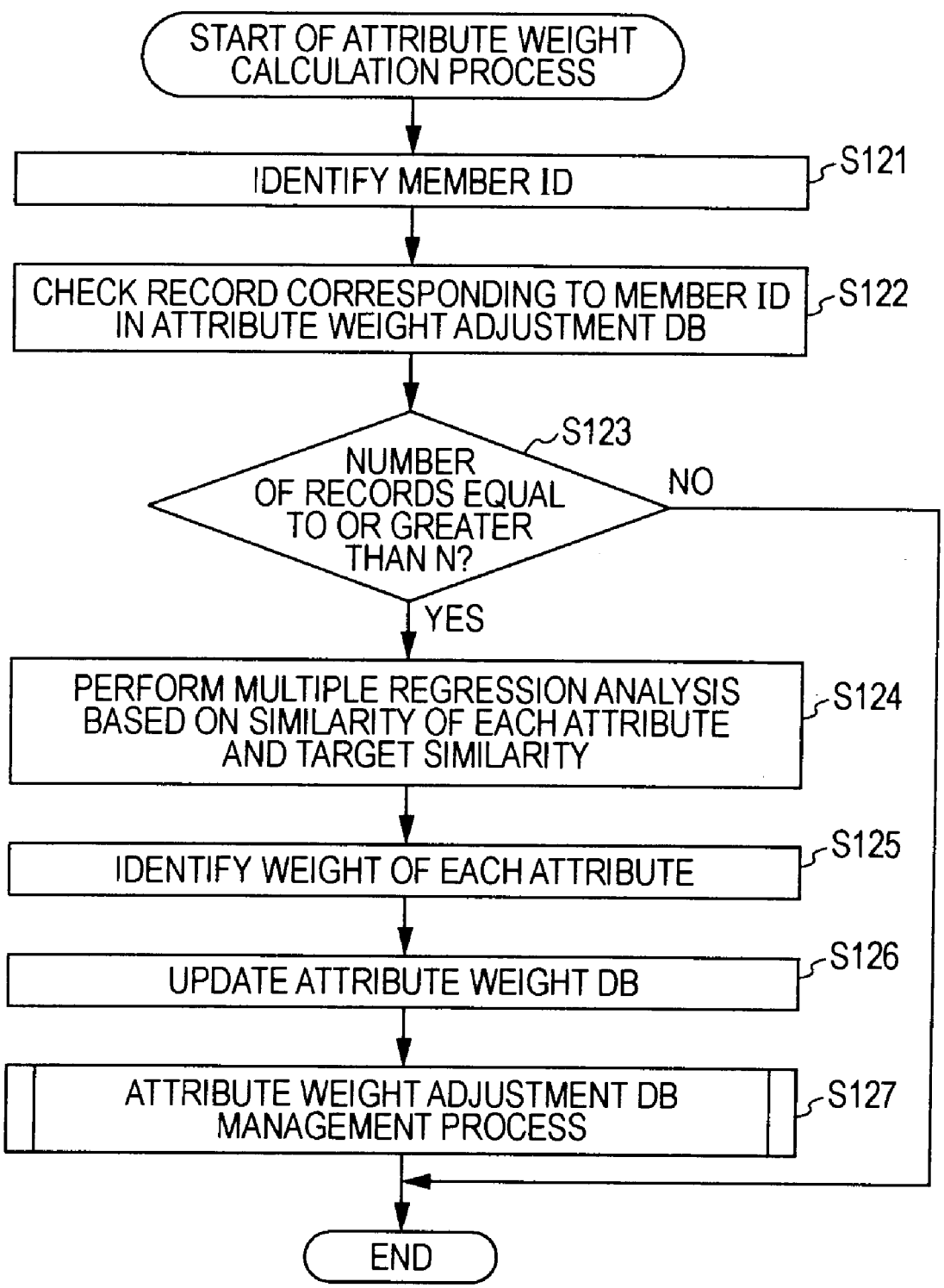
FIG. 12 is a flowchart illustrating an attribute weight calculation process.
Figure 13:
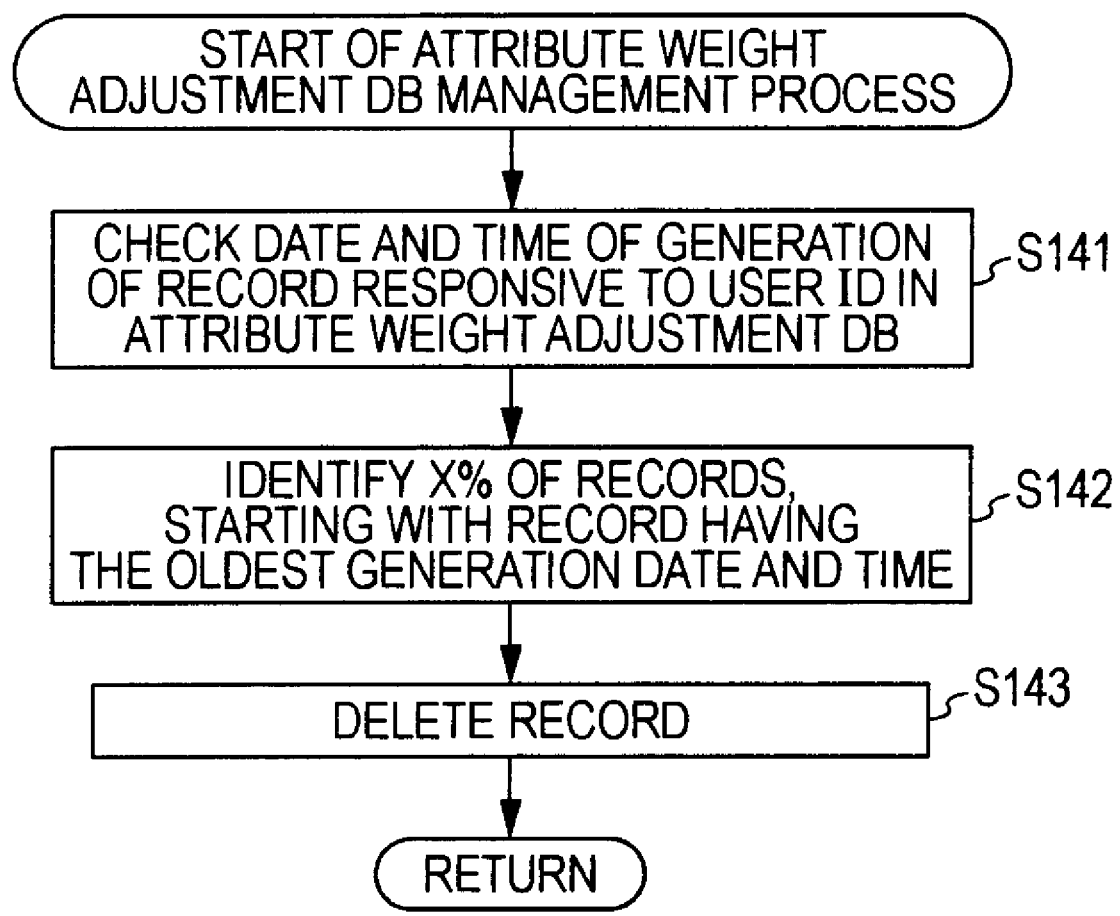
FIG. 13 is a flowchart illustrating an attribute weight adjustment database management process.

The attribute weight adjustment database management process in step S127 of FIG. 12 is described below with reference to a flowchart of FIG. 13.

In step S141, the attribute weight adjustment engine 129 checks the data and time of generation of each record of the member ID identified in step S121, out of the records of the attribute weight adjustment database 132. For example, the attribute weight adjustment engine 129 checks information identifying the date and time at the field "UpdateTime" illustrated in FIG. 10.

In step S142, the attribute weight adjustment engine 129 identifies X % of the records in the order of date and time of generation, from old to young, checked in step S141. In this case, X % (for example, 50%) of the total number of records having the members ID identified in step S121 are identified. The value of X is predetermined.

In step S143, the attribute weight adjustment engine 129 deletes the record of the attribute weight adjustment database 132 identified in step S142.

The attribute weight adjustment database management process is executed in this way. By deleting the old records, the weight of each attribute of the user can be adjusted to respond to a change in the user preference.

The record of the attribute weight adjustment database 132 is generated based on the record of the operation log database 122. The record of the attribute weight adjustment database 132 generated in response to an old operation of the user made on the terminal 121 has old date and time of generation. The record of the attribute weight adjustment database 132 generated in response to a new operation of the user made on the terminal 121 has new date and time of generation.

The operations of the user can be different from each other in importance to the user preference. For example, the user may protect data of given content from deletion, or may register given content in a "favorite" folder. Such operations may be understood as the user's positive evaluation to the content (item) and suggest a strong preference to the content. Such operations distinctly indicate a positive evaluation.

Although the user's reproducing and viewing data of given content suggests a positive evaluation to the content (item), such an operation does not necessarily assure the user's strong preference to the content. The user may simply view the data of the recorded content for check purposes only.

The user operations are thus different from each other in importance to the user preference. If old data is automatically deleted without paying attention to the type of the user operation, the weight adjustment may not be appropriately performed with the user preference recognized.

In the attribute weight adjustment database management process in step S127 of FIG. 12, the type of operation is also taken into consideration. The type of user operation is taken into consideration as described below in the attribute weight adjustment database management process in step S127 of FIG. 12.

FIG. 14 illustrates another example of the attribute weight adjustment database 132. Data on each row corresponds to each record of the attribute weight adjustment database 132 as previously discussed with reference to FIG. 10. Each record of the attribute weight adjustment database 132 includes five fields: a field "MemberId," a field "TargetScore," a field "Attributescore," a field "UpdateTime," and a field "permissible number of uses."

The field "MemberId," the field "TargetScore," the field "Attributescore," and the field "UpdateTime" in FIG. 14 are identical to the counterparts in FIG. 10, and the discussion thereof is omitted here.

The field "permissible number of uses" in FIG. 14 stores a numerical value representing how many times the record can be used in the attribute weight calculation process. Stored in the field "permissible number of uses" is a value that is determined in response to the type of operation identified by the record of the operation log database 122 when the record is generated.

The information stored in the field "LogType" of a record of the operation log database 122 is "good3" if the user performs an operation distinctly indicating the user's positive evaluation of an item. For example, the information stored in the field "LogType" may be "good2" or "good1" if the user performs an operation suggesting the user's positive evaluation of the item.

The information stored in the field "LogType" is "bad3" if the user deletes data of content responsive to an item or if the user performs an operation distinctly indicating the user's negative evaluation. The information stored in the field "LogType" may be "bad2" or "bad1" if the user performs an operation suggesting the user's negative evaluation.

When the record of the attribute weight adjustment database 132 is generated, the information stored in the field "LogType" of the record of the operation log database 122 may be "good3." In such a case, 131 is stored in the field "permissible number of uses." When the record of the attribute weight adjustment database 132 is generated, the information stored in the field "LogType" of the record of the operation log database 122 may be "good2" or "good1." In such a case, "2" or "1" is stored in the field "permissible number of uses."

When the record of the attribute weight adjustment database 132 is generated, the information stored in the field "LogType" of the record of the operation log database 122 may be "bad3." In such a case, "3" is stored in the field "permissible number of uses." Similarly, when the record of the attribute weight adjustment database 132 is generated, the information stored in the field "LogType" of the record of the operation log database 122 may be "bad2" or "bad1." In such a case, "2" or "1" is stored in the field "permissible number of uses."

The information "good3," "good2," "good1," "bad3," "bad2," and "bad1" stored in the field "LogType" of the record of the operation log database 122 is described for explanatory purposes only. The information actually stored may be different. It is important that a value stored in the field "permissible number of uses" is determined by the type of operation.

If the type of operation is taken into consideration in the attribute weight adjustment database management process, the attribute weight adjustment database 132 is constructed as illustrated in FIG. 14. The process illustrated in FIGS. 11 and 12 is performed using the attribute weight adjustment database 132 illustrated in FIG. 14.

Figure 15:
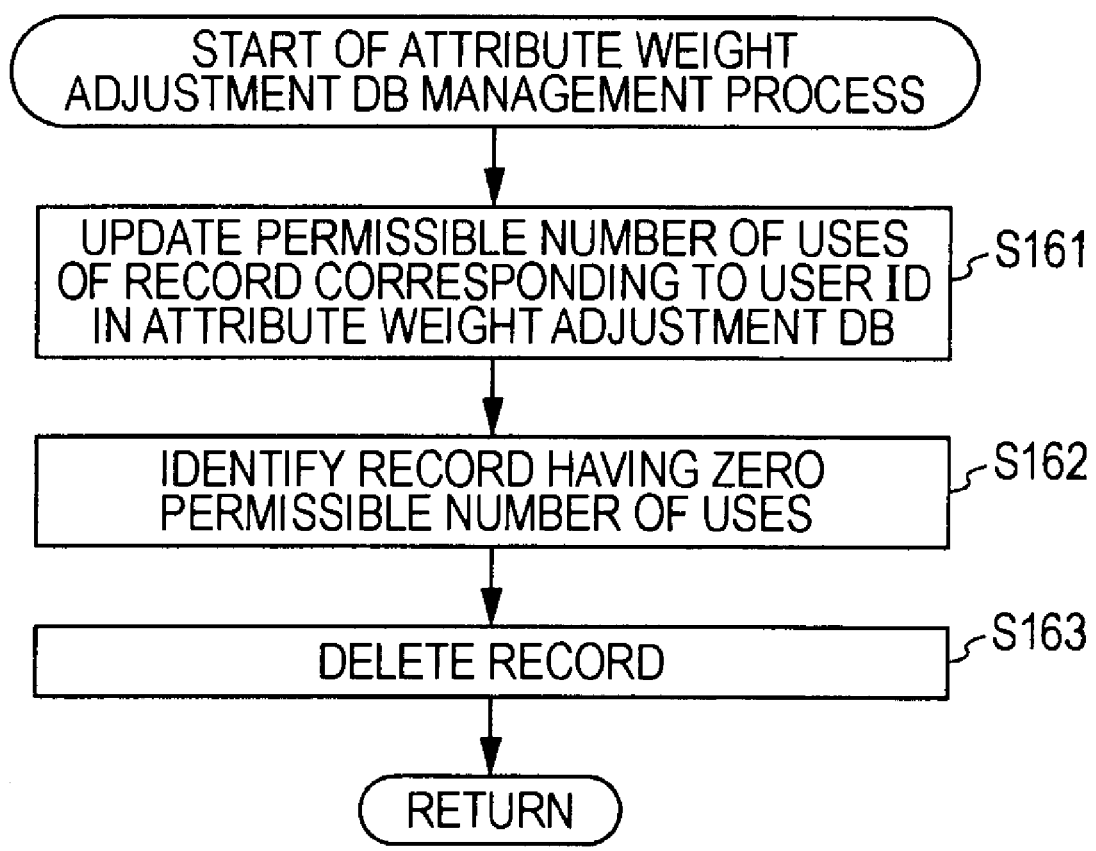
FIG. 15 is a flowchart illustrating another attribute weight adjustment database management process.

Another example of the attribute weight adjustment database management process in step S127 of FIG. 12 is described below with reference to a flowchart of FIG. 15. In the attribute weight adjustment database management process, the type of operation is taken into consideration.

In step S161, the attribute weight adjustment engine 129 updates the permissible number of uses of each record of the member ID identified in step S121, out of the records of the attribute weight adjustment database 132. For example, the value stored in the field "permissible number of uses" of FIG. 14 of each of all the records of the member IDs identified in step S121 is decremented by "1."

In step S162, the attribute weight adjustment engine 129 identifies a record having "0" as the permissible number of uses updated in step S161. For example, the record at the third row in FIG. 14 has the value "2" as the current permissible number of uses, and the updating in step S161 causes the value of the permissible number of uses to be "1." For example, the record at the fourth row in FIG. 14 has the value "3" as the current permissible number of uses, and the updating in step S161 causes the value of the permissible number of uses to be "2."

The records at the second, fifth, and sixth rows have the value "1" as the current permissible number of uses, and the updating in step S161 causes the value of the permissible number of uses to be "0." In step S162, the records at the second, fifth, and sixth rows are identified as having "0."

In step S163, the attribute weight adjustment engine 129 deletes the record identified as having "0" in step S162.

The attribute weight adjustment database management process is performed in this way. Since whether to delete the record is determined based on the value of the permissible number of uses determined in response to the type of operation, the type of operation is taken into consideration in the attribute weight adjustment database management process. The attribute weight adjustment database 132 appropriately reflecting the user preference is thus constructed. The weight of each attribute of the user is appropriately adjusted.

The above series of process steps may be executed using hardware or software. If the series of process steps are executed using software, a program forming the software may be installed from a recording medium or via a network to a computer contained in particular hardware, or a computer such as a general-purpose personal computer 700 illustrated in FIG. 16 executing a variety of functions with a variety of programs installed thereon.

A central processing unit (CPU) 701 in FIG. 16 executes a variety of processes under the control of a program stored on a read-only memory (ROM) 702 or a program loaded to a random access memory (RAM) 703 from a storage unit 708. The RAM 703 also stores data the CPU 701 uses in the execution of the processes.

The CPU 701, the ROM 702, and the RAM 703 are interconnected to each other via a bus 704. The input-output interface 705 connects to the bus 704.

The input-output interface 705 also connects to an input unit 706 including a keyboard, a mouse, etc., an output unit 707 including a display such as a cathode ray tube (CRT) or a liquid-crystal display (LCD), a loudspeaker, etc., the storage unit 708 including a hard disk, etc., a communication unit 709 including a network interface, such as a modem, or a LAN card, etc. The communication unit 709 performs a communication process via networks including the Internet.

A drive 710 is connected to the input-output interface 705 as necessary. A removable medium 711 such as a magnetic disk, an optical disk, a magneto-optical disk, or a semiconductor memory is loaded onto the drive 710 as appropriate. The computer program read from the removable medium 711 is installed onto the storage unit 708.

If the above described process steps are executed using software, the computer program of the software is installed from the network such as the Internet or from the recording medium such as the removable medium 711.

The recording media include the program loaded removable medium 711 that is supplied separately from the computer illustrated in FIG. 16 to distribute the computer program to the user. The removable medium 711 may be one of a magnetic disk (such as a Floppy Disk (Registered Trademark)), an optical disk (such as a compact disk read only memory (CD-ROM), or a digital versatile disk (DVD)), a magneto-optical disk (MD (Mini-Disk) (Registered Trademark)), and a semiconductor memory. The recording media also include the ROM 702, and a hard disk contained in the storage unit 708, each distributed in the computer and storing the computer program thereon.

The program of the computer may be executed in the time-series order of the process steps described in this specification, or may be executed in parallel or may be executed at any timing.

The present application contains subject matter related to that disclosed in Japanese Priority Patent Application JP 2008-229312 filed in the Japan Patent Office on Sep. 8, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A recommendation apparatus, comprising:
   user base component extraction means for extracting a user base component selected according to a predetermined criterion from among components of user preference information forming a vector containing a plurality of components, the user preference information representing a preference of a user;
   item base component extraction means for extracting as an item base component a component corresponding to the user base component, from among components of item preference information formed as a vector, the vector containing components of the same number as the number of components of the user preference information, the component of the item preference information generated based on metadata information of each item serving as a target for recommendation;
   base similarity calculation means for calculating a base similarity, the base similarity being between a user base vector containing the user base components and an item base vector containing the item base components of the items serving as the targets for recommendation;
   item candidate identifying means for identifying, based on the base similarity, an item candidate to be recommended to the user;
   user inversion component extraction means for extracting, as a user inversion component, a component other than the user base component from among the components of the user preference information;
   item inversion component extraction means for extracting, as an item inversion component, a component corresponding to the user inversion component from among the components of the item preference information for the item candidates;
   inversion similarity calculation means for calculating an inversion similarity, the inversion similarity being between a user inversion vector containing the user inversion components and an item inversion vector containing the item inversion components of the items serving as the targets for recommendation; and
   recommendation item identifying means for identifying an item to be recommended to the user from among the item candidates based on the inversion similarity.

2. The recommendation apparatus according to claim 1, wherein the user base component is selected in accordance with an occupancy rate of the value of the user base component of the user preference information to the sum of the values of the components of the user preference information.

3. The recommendation apparatus according to claim 2, wherein the user base component is selected in accordance with the occupancy rate and maturity of the user preference information.

4. The recommendation apparatus according to claim 3, wherein the maturity of the user preference information is calculated based on information relating to a component of the user preference information, the user preference information being updated by a predetermined operation, the predetermined operation identified as an operation related to the item and performed by the user.

5. A recommendation method, comprising the steps of:
   extracting a user base component selected according to a predetermined criterion from among components of user preference information forming a vector containing a plurality of components, the user preference information representing a preference of a user;
   extracting as an item base component a component corresponding to the user base component, from among components of item preference information formed as a vector, the vector containing components of the same number as the number of components of the user preference information, the component of the item preference information generated based on metadata information of each item serving as a target for recommendation;
   calculating a base similarity, the base similarity being between a user base vector containing the user base components and an item base vector containing the item base components of the items serving as the targets for recommendation;
   identifying, based on the base similarity, an item candidate to be recommended to the user;
   extracting, as a user inversion component, a component other than the user base component from among the components of the user preference information;
   extracting, as an item inversion component, a component corresponding to the user inversion component from among the components of the item preference information for the item candidates;
   calculating an inversion similarity, the inversion similarity being between a user inversion vector containing the user inversion components and an item inversion vector containing the item inversion components of the items serving as the targets for recommendation; and
   identifying an item to be recommended to the user from among the item candidates based on the inversion similarity.

6. A non-transient computer-readable storage medium including computer executable program instructions that, when accessed by a computer, causes the computer to perform a method, the method comprising:

extracting a user base component selected according to a predetermined criterion from among components of user preference information forming a vector containing a plurality of components, the user preference information representing a preference of a user;

extracting as an item base component a component corresponding to the user base component, from among components of item preference information formed as a vector, the vector containing components of the same number as the number of components of the user preference information, the component of the item preference information generated based on metadata information of each item serving as a target for recommendation;

calculating a base similarity, the base similarity being between a user base vector containing the user base components and an item base vector containing the item base components of the items serving as the target for recommendation;

identifying, based on the base similarity, an item candidate to be recommended to the user;

extracting, as a user inversion component, a component other than the user base component from among the components of the user preference information;

extracting, as an item inversion component, a component corresponding to the user inversion component from among the components of the item preference information for the item candidates;

calculating inversion similarity, the inversion similarity being between a user inversion vector containing the user inversion components and an item inversion vector containing the item inversion components of the items serving as the targets for recommendation; and identifying an item to be recommended to the user from among the item candidates based on the inversion similarity.

7. A recommendation apparatus, comprising:

a user base component extraction unit extracting a user base component selected according to a predetermined criterion from among components of user preference information forming a vector containing a plurality of components, the user preference information representing a preference of a user;

an item base component extraction unit extracting as an item base component a component corresponding to the user base component, from among components of item preference information formed as a vector, the vector containing components of the same number as the number of components of the user preference information, the component of the item preference information generated based on metadata information of each item serving as a target for recommendation;

a base similarity calculation unit calculating a base similarity, the base similarity being between a user base vector containing the user base components and an item base vector containing the item base components of the items serving as the target for recommendation;

an item candidate identifying unit identifying, based on the base similarity, an item candidate to be recommended to the user;

a user inversion component extraction unit extracting, as a user inversion component, a component other than the user base component from among the components of the user preference information;

an item inversion component extraction unit extracting, as an item inversion component, a component corresponding to the user inversion component from among the components of the item preference information for the item candidates;

an inversion similarity calculation unit calculating an inversion similarity, the inversion similarity being between a user inversion vector containing the user inversion components and an item inversion vector containing the item inversion components of the items serving as the target for recommendation; and a recommendation item identifying unit identifying an item to be recommended to the user from among the item candidates based on the inversion similarity.

* * * * *